(12) United States Patent
Albrechtsen et al.

(10) Patent No.: US 11,726,262 B2
(45) Date of Patent: Aug. 15, 2023

(54) IN-PLANE CHIP-SCALE PHOTONIC DEVICE

(71) Applicant: Danmarks Tekniske Universitet, Kongens Lyngby (DK)

(72) Inventors: Marcus Albrechtsen, Kgs. Lyngby (DK); Babak Vosoughi Lahijani, Kgs. Lyngby (DK); Søren Stobbe, Kgs. Lyngby (DK); Rasmus Ellebæk Christiansen, Kgs. Lyngby (DK)

(73) Assignee: DANMARKS TEKNISKE UNIVERSITET, Kgs. Lyngby (DK)

( * ) Notice: Subject to any disclaimer, the term of this patent is extended or adjusted under 35 U.S.C. 154(b) by 0 days.

(21) Appl. No.: 17/747,290

(22) Filed: May 18, 2022

(65) Prior Publication Data

US 2022/0283372 A1 Sep. 8, 2022

Related U.S. Application Data

(63) Continuation of application No. PCT/EP2020/082545, filed on Nov. 18, 2020.

(30) Foreign Application Priority Data

Nov. 18, 2019 (EP) ..................................... 19209876

(51) Int. Cl.
*G02B 6/12* (2006.01)
*G02B 6/26* (2006.01)
(Continued)

(52) U.S. Cl.
CPC ...................................... *G02B 6/14* (2013.01)

(58) Field of Classification Search
CPC ........ G02B 6/14; G02B 6/1228; G02B 6/264; G02B 6/305; G02B 6/32; G02B 6/122;
(Continued)

(56) References Cited

U.S. PATENT DOCUMENTS 5,835,458 A * 11/1998 Bischel ................ G11B 7/1353
369/44.29
8,213,476 B1 7/2012 Wanke et al.
(Continued)

FOREIGN PATENT DOCUMENTS

EP 0640865 A1 3/1995
EP 1431801 A2 6/2004
(Continued)

OTHER PUBLICATIONS

"Light coupling for on-chip optical interconnects" in Optics and Laser Technology 97 (2017): 154-160.

*Primary Examiner* — Kaveh C Kianni
*Assistant Examiner* — Hung Q Lam
(74) *Attorney, Agent, or Firm* — Dinsmore & Shohl LLP

(57) ABSTRACT

An in-plane photonic device is provided for transmission of an optical signal across a gap, in particular an in-plane photonic device for use in a photonic integrated circuit with one or more in-plane crossings of electrical connections and photonic waveguides. One embodiment relates to an in-plane photonic device for use in a photonic integrated circuit with in-plane crossings of electrical connections and photonic waveguides, including: at least one input optical waveguide; and at least one output optical waveguide; wherein the at least one input optical waveguide and the at least one output optical waveguides are positioned such that a gap between them separates the input and the output optical waveguide(s), and wherein the input and the output optical waveguides are configured for optical mode matching across the gap, such that an optical signal can be transmitted from the input optical waveguide to the output optical waveguide across the gap.

20 Claims, 11 Drawing Sheets

(51) Int. Cl.
*G02B 6/42* (2006.01)
*G02B 6/14* (2006.01)

(58) Field of Classification Search
CPC .......... G02B 2006/12035; G02B 2006/12097;
G02B 2006/12102; G02B 2006/12152
USPC ............ 385/16, 28, 30, 40, 43, 50, 129–132
See application file for complete search history.

(56) References Cited

U.S. PATENT DOCUMENTS

| | | |
|---|---|---|
| 2004/0131102 A1 | 7/2004 | Jette et al. |
| 2005/0058425 A1* | 3/2005 | Berini ................. G02B 6/1226 385/147 |
| 2010/0226608 A1 | 9/2010 | Chen et al. |
| 2011/0069969 A1 | 3/2011 | Hochberg et al. |
| 2017/0324446 A1 | 11/2017 | Cook et al. |
| 2019/0258175 A1 | 8/2019 | Dietrich et al. |

FOREIGN PATENT DOCUMENTS

| | | |
|---|---|---|
| WO | 03/104885 A1 | 12/2003 |
| WO | 2004/097475 A1 | 11/2004 |
| WO | 2013/010494 A1 | 1/2013 |

* cited by examiner

IN-PLANE CHIP-SCALE PHOTONIC DEVICE

CROSS-REFERENCE TO RELATED APPLICATIONS

This application is a continuation of International Patent Application No. PCT/EP2020/082545 filed on Nov. 18, 2020 and designating the U.S. and which claims priority to European Patent Application 19209876.2 filed on Nov. 18, 2019, the entire content of both are incorporated herein by reference in their entirety.

FIELD OF THE INVENTION

The present disclosure relates to an in-plane photonic device for transmission of an optical signal across a gap, in particular an in-plane photonic device that is suitable for use in a photonic integrated circuit with one or more in-plane crossings of electrical connections and photonic waveguides.

BACKGROUND OF INVENTION

The functionality and performance of integrated electrical devices, such as an electro-photonic device, rely on electrically connecting specific regions of said device, such as for providing an operating current. Specific regions of the integrated device may simultaneously require to be electrically isolated from each other in order to prevent short circuit or electrical noise to influence a sensor component of the same device.

In many cases, the integrated device comprises a closed electrical circuit, wherein parts of the device cannot be isolated by conventional methods. This is most certainly true for electro-photonic devices comprising a conductive optical waveguide, such as a waveguide in a semiconducting material, such as silicon.

At the same time, electrical components of the device need to be electrically contacted for their operations. This is typically carried out by standardized semiconductor fabrication methods offering out-of-plane solutions such as vias formation, wherein conducting layers (electrically isolated from the device layers) can be reached through deep etched holes (vias). Vias are standard in complex multilayer-lithography circuitry but in electronically simpler devices, such as spectrometers, sensors, and more, the via etching and subsequent filling with metal constitutes additional process steps resulting in additional production complexity, leading to additional costs.

Wire bonding is an alternative solution, wherein out-of-plane wires connect metal contacts on a chip or on a chip carrier. The process of wire bonding is, however, time-consuming. Furthermore, having contacts at the center of the chip, which would be needed for contacting electrically isolated islands, would be cumbersome. For more complex designs, however, wire bonding would be expensive and hardly scalable (and the preferred solution in current technology would be vias).

There is a need in the optoelectronic industry for a scalable and efficient low-cost solution to crossing electronic connections and photonic waveguides while, in some cases, also mechanically and thermally isolating chip-scale features.

SUMMARY OF THE INVENTION

The present inventors have realized that the conventional methods do not offer a practical, scalable, method for mass production of low-cost integrated photonic circuits. Furthermore, the present inventors have surprisingly realized how optical waveguides can be configured for electrical isolation of selected regions of an electro-photonic device at no significant loss of the optical signal. Contrary to conventional methods, such as vias and wire bonding, the inventors have realized how electrical connections can be realized in-plane and on a chip-scale.

The present disclosure therefore relates to an in-plane and/or monolithic photonic device having input and output waveguides separated from each other, wherein an optical signal may be transmitted between said waveguides across said gap, preferably at a high transmission. One embodiment of the photonic device comprises at least one (or more) input optical waveguide, separated from at least one (or more) output optical waveguide, by a gap. In the preferred embodiment this device is configured for transmission of an optical signal between the at least one input optical waveguides and the at least one output optical waveguides. Advantageously the at least one input and the at least one output optical waveguide may be configured for optical mode matching across said gap. The presently disclosed in-plane photonic device is preferably suitable for use in a photonic integrated circuit with one or more in-plane crossings of electrical connections and photonic waveguides, in particular suitable for use as circuit crossing in the photonic integrated circuit with in-plane crossings of electrical connections and photonic waveguides.

The gap may be in form of an electrical isolation gap, such that the at least one input optical waveguide is electrically isolated from at least one output optical waveguide. The gap may also, or alternatively, be in form of a thermal isolation gap, such that the at least one input optical waveguide is thermally isolated from at least one output optical waveguide, and/or be in form of a mechanical isolation gap, such that the at least one input optical waveguide is mechanically isolated from at least one output optical waveguide.

Specific embodiments of the present disclosure may be used to form an on-chip interferometer, as disclosed in "Nanoelectromechanical interferometer for visible to infrared wavelengths" filed on 18 Nov. 2019 as EP19209783.0 by the same Applicant. By ensuring that specific parts of such an interferometer are electrically isolated while allowing for electrical connection of other, voltage can be supplied to control the function of said interferometer.

A quantum dot single-photon source, as exemplified in Midolo, L. et al. Electro-optic routing of photons from single quantum dots in photonic integrated circuits. Opt. Express 25, 33514 (2017), can in combination with the presently disclosed photonic device be used to form an on-chip interferometer by ensuring that specific parts of such interferometer are electrically, and/or thermally, and/or mechanically isolated while allowing for electrical, and/or thermal, and/or mechanical connection of other, and thus voltage, heat, and mechanical motions can be supplied to control the function of said interferometer.

The present disclosure further relates to a planar and/or monolithic integrated circuit having in-plane crossings of electrical connections and photonic waveguides, the planar integrated circuit comprising one or more of the presently disclosed in-plane photonic devices. In particular said planar integrated circuit may comprise at least one isolated part and wherein at least one of said in-plane photonic devices is configured for supplying current and/or for voltage control of said at least one isolated part. The voltage control may for example be used to connect said isolated part to ground, e.g. to avoid floating potentials. In another embodiment the planar integrated circuit comprises at least two optically connected active photonic components, e.g. connected in series like an optical interconnect. The active photonic components may be selected from the group of: delay-line components, phase-modulator components, switch components, directional coupler components, buried heterostructure components, cavity components, quantum dot components. This optical connection between active photonic components may advantageously be provided by at least one of the presently disclosed in-plane photonic devices. In that regard the gap of said in-plane photonic device is preferably configured to electrically and/or thermally isolate said serially connected active photonic components. The wires of the at least one in-plane photonic device may be configured to control the voltage of and/or supply a current to at least one optical waveguide, e.g. in at least one of said serially connected active photonic components, in order to control and/or read out optoelectronic features on the chip, such as chip-scale light sources and/or detectors and/or modulators. In a further embodiment of the integrated circuit the current is supplied (or the voltage is controlled) from electrical bonding pads from at least 100 µm, more preferably at least 200 µm, most preferably at least 500 µm, away from the active photonic device, thereby reducing the chip packaging complexity and cost.

Hence, the present disclosure further relates to a method controlling/activating at least part of an integrated circuit utilizing at least one of the presently disclosed in-plane photonic devices, as explained above, e.g. for supplying current and/or controlling the voltage of least one isolated part of a planar/monolithic integrated circuit having in-plane crossings of electrical connections and photonic waveguides utilizing the presently disclosed in-plane photonic device.

Consequently, the gap should be sufficiently large in order to obtain the desired electrical, thermal and/or mechanical isolation between the two or more optical waveguides. At the same time, the input and the output optical waveguides should preferably be configured for optical mode matching across the gap, enabling the optical signal to propagate through said device without any significant optical loss. The gap can for example be shorter than 500 nm, or even shorter than 200 nm, to ensure sufficient isolation and high optical transmission. Preferably said device is configured for increased optical transmission and/or decreased optical reflectivity by optical mode matching between the modes in the input and the output optical waveguides.

The presently disclosed photonic device may be configured with one or more mode converters for optical mode matching near the gap, wherein the mode converters may be in the form of widenings and/or narrowings of the input and/or the output optical waveguides. Furthermore, each waveguide may comprise a mode converter for expanding and/or shrinking the optical mode of the optical signal. Thereby, the one or more input optical waveguides may comprise a mode converter expanding the optical mode of the optical signal, towards the gap, while the output optical waveguide may comprise a mode converter shrinking the optical mode of the optical signal.

The in-plane photonic device is preferably configured for lensing of the optical signal, from the one or more input optical waveguides to the one or more output optical waveguide, across the gap. The device may comprise lensing features having different refractive index than the material of the input and/or output optical waveguide. The in-plane photonic device may for example be provided in silicon while the lensing features may be air-filled features, e.g. in the form of cavities.

The in-plane photonic device may comprise mode converters for expanding and/or shrinking the optical mode of the optical signal. Said mode converters may further comprise lensing features for lensing of an expanded and/or shrunken optical mode of the optical signal.

The in-plane photonic device may as a result provide electrical, thermal and/or mechanical isolation between selected parts of an integrated electro-photonic device while, concurrently, the optical signal can be transmitted, with low loss, through said in-plane photonic device.

In a preferred embodiment of the present disclosure, the in-plane photonic device comprises one or more tethers and/wires for forming a connection, preferably an electrical connection, between the input and/or the output optical waveguides and one or more of the surrounding bulk materials in proximity of the waveguide(s). The tethers/wires may additionally provide the waveguides with mechanical stability. For example, the tethers and/or wires may act to or contribute to suspending the waveguides for provision of one or more suspended waveguide structures.

The tethers/wires may be provided such that they form an electrical connection substantially perpendicular to the direction of propagation of the optical signal, thereby the in-plane photonic device forms an in-plane chip-scale electro-photonic circuit crossing. However, it should be noted that the tethers/wires may be formed at any angle with respect to the direction of propagation of the optical signal.

DETAILED DESCRIPTION OF THE DRAWINGS

Figure 9A:
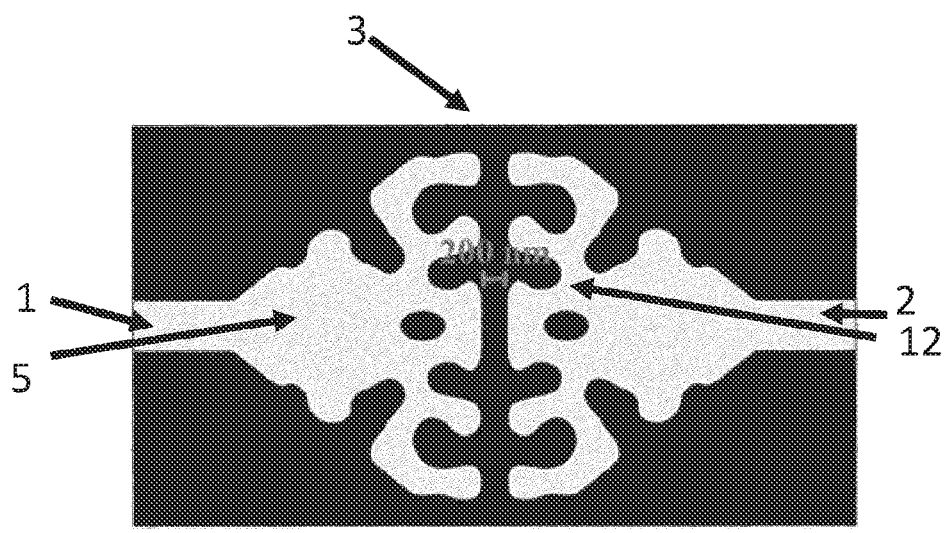
FIG. 9A shows an input and an output optical waveguides having a topology optimized design comprising larger minimum feature size, making it suitable for clean room processing methods such as deep UV lithography.
Figure 9B:
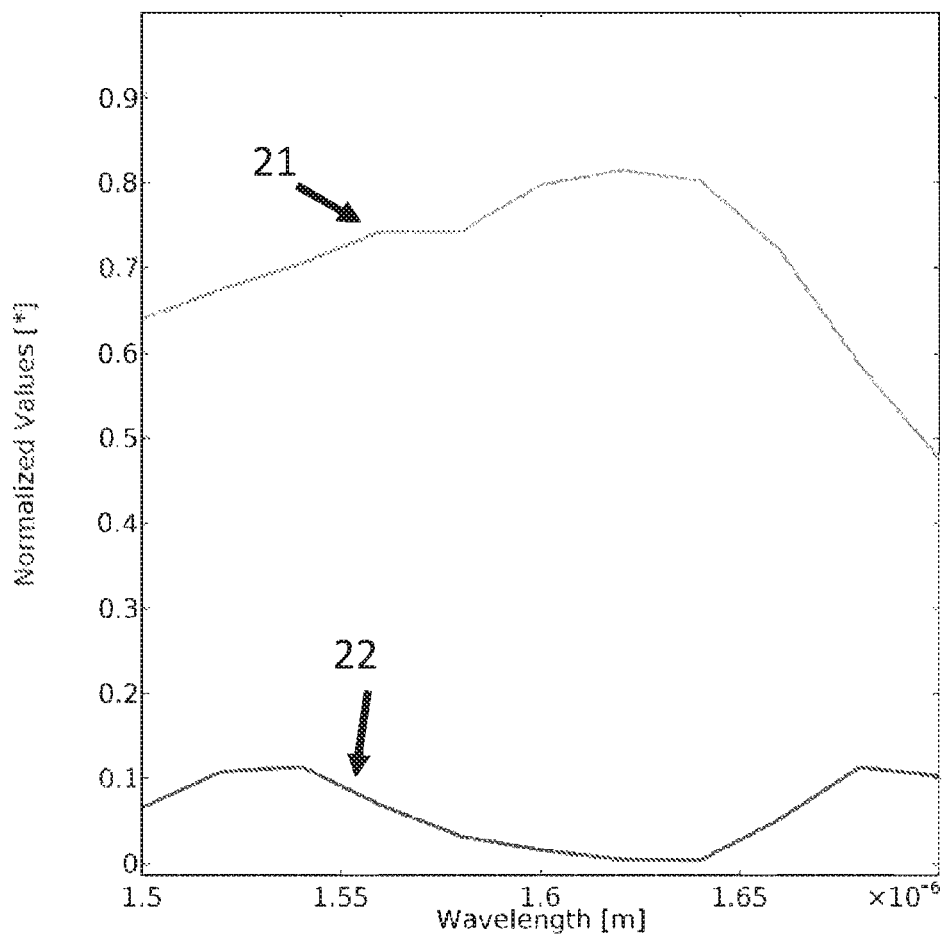
Figure 10A:
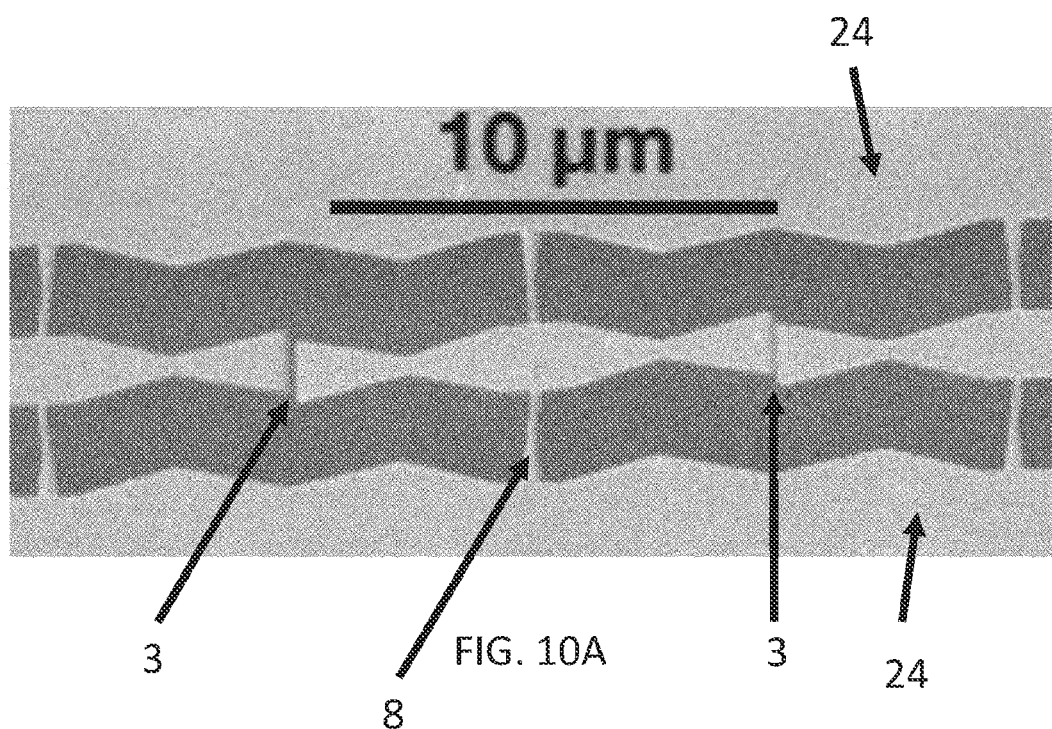
Figure 10B:
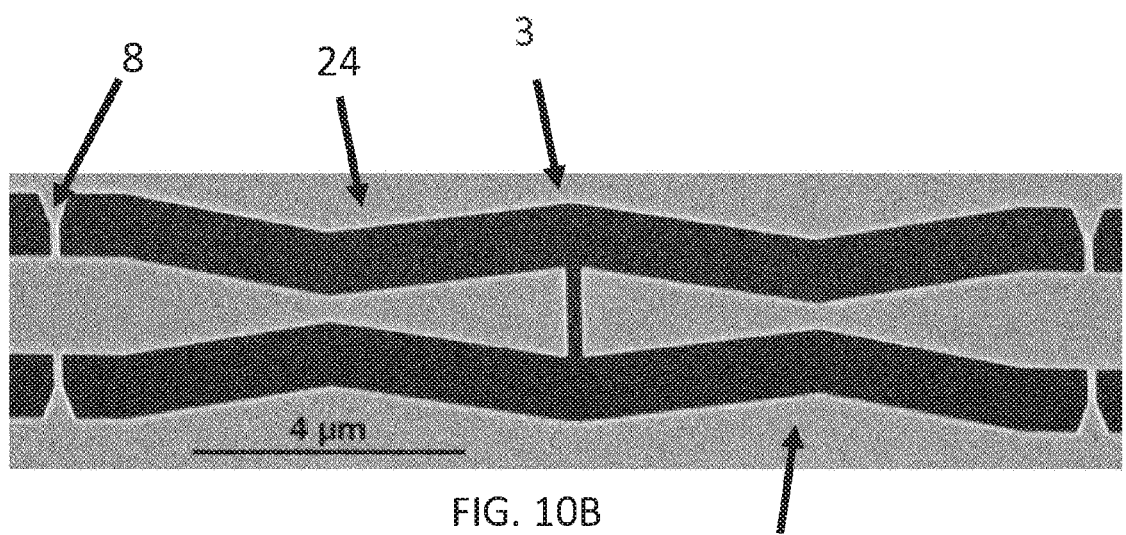

FIG. 9B shows calculated transmission (green line) and reflection (blue line) spectra for the design given in FIG. 9A; and FIG. 10A-B shows scanning electron micrographs of multiple photonic devices, comprising input and output optical waveguides, comprising wires that contact the surrounding bulk material, wherein the wires act to suspend the waveguides. The more stable wires of FIG. 10B act to prevent short-circuit and increase transmission between the waveguides.

DEFINITIONS

An integrated circuit (IC) is a complete circuit or group of circuits manufactured with planar technology using semiconductor materials, such as silicon, such as silicon-on-insulator. Hence, an integrated circuit or quasi-monolithic integrated circuit can also be referred to as an IC, a chip, or a microchip, or planar IC, or chip-scale device. A monolithic circuit is a complete circuit or group of circuits where all components are manufactured into or on top of a single chip of semiconductor materials, such as silicon, such as silicon-on-insulator. Hence, a monolithic circuit is not necessarily a planar circuit. The presently disclosed in-plane photonic device is preferably suitable for use in planar chip-scale integrated circuits. The presently disclosed in-plane photonic device is preferably also suitable for use in monolithic circuits.

DETAILED DESCRIPTION OF THE INVENTION

The present disclosure relates in one embodiment to an in-plane photonic device comprising: one or more input optical waveguides; and one or more output optical waveguides; wherein the input and the output optical waveguides are positioned such that a gap between them electrically isolates the input and the output optical waveguides and wherein the input and the output optical waveguides are configured for optical mode matching across the gap, such that an optical signal can be transmitted from the one or more input optical waveguides to the one or more output optical waveguide across the gap.

The input and/or the output optical waveguides may be any type of optical waveguide. Preferably the input and/or the output optical waveguides is a two dimensional waveguide, such as a strip waveguide, a slab waveguide, a ridge waveguide, or any other type of suitable waveguide. Furthermore, where applicable, the input optical waveguides and/or the output optical waveguides may be provided as different types of waveguides. Moreover, the input and/or the output optical waveguides may be provided on a substrate, preferably with a cladding layer, or they may be suspended waveguides. The input optical waveguides and/or the output optical waveguides may be a mixture of suspended and non-suspended structures, such as structures provided on a substrate.

The in-plane photonic device is preferably configured for an optical signal with a wavelength in the range between 400 nm and 20 µm, such as in the range between 600 nm and 10 µm, such as in the range between 800 nm and 5 µm, such as in the range between 1000 nm and 2 µm, such as in the range between 1300 nm and 1700 nm, such as around 1550 nm, such as 1550 nm.

Gap and Gap Size

The gap of the presently disclosed in-plane photonic device separating the at least one input optical waveguide from the at least one output optical waveguide in form of an electrical isolation region made of vacuum or air and/or a non-electrically and/or low-electrically conductive material is preferably configured such that an electrical current cannot be conducted across the gap, i.e. the electrical resistance across the gap is preferably so high that the gap functions as an electrical isolation gap. In that regarding the gap may also, or alternatively, form a thermal isolation region made of vacuum or air and/or a non-thermally and/or low-thermally conductive material such that the heat conducted across the gap is reduced, and/or a mechanical isolation region made of vacuum or air and/or a non-mechanically and/or low-mechanically conductive material such that a mechanical motion cannot be conducted across the gap.

Hence, the term "electrical isolation gap" as used herein can also mean that the gap also forms a mechanical isolation gap and/or a thermal isolation gap.

In one embodiment of the present disclosure the gap size, such as the distance between the input and the output optical waveguide is between $\lambda/200$ and $\lambda/5$, where $\lambda$ is the shortest wavelength of the optical signal. The gap size may therefore be chosen depending on the wavelength of the optical signal.

In a further embodiment of the present disclosure the gap size is between about 10 nm and 2000 nm, more preferably between about 10 nm and 200 nm. Preferably, the gap size, design and material is selected for providing sufficient electrical, thermal and/or mechanical isolation between the input and output waveguides, and then mode matching features are selected and designed for optical mode matching of the optical signal, based on the wavelength, such as the shortest wavelength, of said optical signal, in particular selected for improving and/or maximizing the optical mode matching across the gap, e.g. high transmission and/or low reflection. In that regard the at least one input waveguide, the gap and the at least one output waveguide can be seen as a near-field antenna.

Transmission

In one embodiment of the present disclosure the in-plane photonic device is configured for transmission of the optical signal, from the at least one or more input optical waveguides to the at least one or more output optical waveguides, with a transmission of at least 50%, such as at least 60%, such as at least 70%, such as at least 80%, such as at least 90%, such as at least 95%, such as at least 97%, such as at least 99%. Said device is preferably configured for optical transmission of the optical signal, such that at least 50%, such as at least 60%, such as at least 70%, such as at least 80%, such as at least 90%, such as at least 95%, such as at least 97%, such as at least 99% of the intensity of the optical signal received by said device, such as by the input optical waveguide(s), is transmitted to the output optical waveguide(s), across the gap.

Losses of the optical signals may include in-plane losses and out-of-plane losses during transmission of the optical signals from the input optical waveguides to the output optical waveguides. A part of the optical signals may be reflected back to the point of origin of said optical signal, such as an input end of the input optical waveguides, thereby contributing to a decrease in the intensity of the transmitted optical signals at the output optical waveguide, such as an outlet end of the output optical waveguides.

Reflection

In one embodiment of the present disclosure the in-plane photonic device is configured for reflecting below 50%, such as below 40%, such as below 30%, such as below 20%, such as below 10%, such as below 5%, such as below 3%, such as below 1% of the input optical signal, wherein said input optical signal is substantially or equal to the intensity of the optical signal received by the input optical waveguide.

Mode Matching

In one embodiment of the present disclosure the in-plane photonic device is configured for increased optical transmission by, at least in part, optical mode matching between the modes in the input and the output optical waveguides. The term "mode matching" as used herein means making the modes of the two waveguides as similar to each other as possible, such that the overlap integral of the modes is as close to unity as possible or otherwise tailor the modes to maximize the transmission. The optical transmission may be considered as the intensity ratios between the optical signal propagating in the output optical waveguide and the optical signal that is propagating in the input optical signal. The optical signal propagating in the input optical waveguide may be substantially equal, such as equal, to the optical signal received by the input optical waveguide. The optical signal propagating in the output optical waveguide may be substantially equal, such as equal, to the optical signal transmitted from the input optical waveguide to the output optical waveguide, such as across the gap.

In one embodiment of the present disclosure the in-plane photonic device is configured for decreased optical reflectivity by, at least in part, optical mode matching between the modes in the input and the output optical waveguides. The optical reflectivity may be considered as the ratio between the intensity of the optical signal received by the at least one input optical waveguide and the intensity of a reflected optical signal, such as reflected back to the point of introduction to the at least one input optical waveguide. The reflected optical signal may however be measured at any suitable position for determining the intensity of a reflected optical signal, wherein the reflected optical signal is reflected by the in-plane photonic device, such as at interfaces of said device.

In one embodiment of the present disclosure the input and/or the output optical waveguide is a type of waveguide selected from the list including a slot waveguide, a strip waveguide, a rib waveguide, a segmented waveguide, a photonic crystal waveguide, a laser-inscribed waveguide, and any other waveguide known to a person skilled in the art. It should be noted that the input and output optical waveguide may be waveguides of different types.

Mode Converters

In one embodiment of the present disclosure each waveguide comprise a mode converter, for optical mode matching, near the gap, the mode converter preferably provided in the form of a widening and/or a narrowing of said waveguide(s) near, preferably towards, the gap.

In one embodiment of the present disclosure the mode converters are configured for modifying the optical mode, such as to expand and/or to shrink the optical mode of the optical signal.

In one embodiment of the present disclosure the in-plane photonic device is configured for optical mode matching between the input and the output optical waveguides, by, at least partly, narrowing of one or both waveguides near the gap. The waveguide(s) may comprise a narrowing near, preferably towards, the gap. The input and the output optical waveguides may both comprise a narrowing, and the waveguides may be positioned such that they overlap along the propagation direction of the optical signal.

In another embodiment of the present disclosure the in-plane photonic device is configured for optical mode matching between the input and the output optical waveguides, by, at least partly, widening of the waveguide(s) near the gap.

In one embodiment of the present disclosure the in-plane photonic device comprise input and output optical waveguides that are mirror symmetric with the mirror plane defined through the center of the gap.

In one embodiment of the present disclosure the mode converter of the input optical waveguide is configured for expanding the optical mode and the mode converter of the output optical waveguide is configured for shrinking the optical mode. The optical signal may as a consequence be transmitted across the gap following mode expansion, and thereafter, following transmission, the optical mode is shrunken in the output optical waveguide.

In one embodiment of the present disclosure the mode converter(s) of the input optical waveguide is configured for shrinking the optical mode and the mode converter of the output optical waveguide is configured for expanding the optical mode In one embodiment of the present disclosure the mode converter(s) widen or narrow near, such as towards, the gap according to a function, such as a linear function, a parabolic function, a step function, and/or an elliptic function or a combination thereof.

Lensing

Lensing as used herein refers to focusing or collimating or otherwise shaping of a light beam by means of refraction. Hence, a lens feature as used herein refers to a transmissive part of a waveguide that focuses or collimates or shapes a light beam by means of refraction. A lens feature may consist of a material with a different index of refraction than the surrounding material, such as the material of the waveguide. However, lensing may also be achieved by forming the waveguide on one or both sides of the gap, e.g. by means of concave and/or convex structures. In that case lensing can be achieved without changing the refractive index of the material of the waveguide itself.

In one embodiment of the present disclosure the in-plane photonic device is configured for lensing of the optical signal across the gap, such as from the input optical waveguide to the output optical waveguide. Lensing can be obtaining by including at least one lensing feature in the at least one input optical waveguide and/or in the at least one output optical waveguide. Lensing features are provided for improving the optical mode matching across the gap.

In one embodiment of the present disclosure the in-plane photonic device comprises one or more lensing features, for lensing of the optical signal across the gap. The lensing features may be positioned on the input optical waveguide and/or the output optical waveguide and said lensing features may further be mirror symmetric with the mirror plane(s) defined by the center of the gap and/or the center of the waveguide(s). In one embodiment of the present disclosure the number of lensing features on each side of the gap is identical, but in another embodiment the number of lensing features are different on each side of the gap.

In one embodiment of the present disclosure the lensing features have a different refractive index than the material of the input and/or the output optical waveguides. The lensing features may for example consist of or comprise gas, such as air, filled cavities. The lensing features may therefore be manufactured in any material having a different refractive index than the material of said waveguides.

In one embodiment of the present disclosure the in-plane photonic device is configured for lensing of an expanded mode of the optical signal, such as for increased transmission and/or decreased reflectivity across the gap.

In one embodiment of the present disclosure the in-plane photonic device is configured for lensing of a shrunken mode of the optical signal, such as for increased transmission and/or decreased reflectivity across the gap.

In one embodiment of the present disclosure the input and the output optical waveguides comprise lensing features, the lensing features being configured, such as coupled, for decreased reflection of the optical signal and/or increased transmission of the optical signal between the input and the output optical waveguides.

In an embodiment of the present disclosure, the input and/or the output optical waveguides are arranged such that an optical signal can be transmitted from the input optical waveguide to the output optical waveguide across said gap.

In a further embodiment of the present disclosure, the input optical waveguides and the output optical waveguides comprise a number of lensing features. The lensing features may be subwavelength structures. In a specific embodiment, the lensing features are arranged symmetrically on both sides of the gap. The lensing features may be areas of the input and/or the output optical waveguide comprising or consisting a different index of refraction, as compared to said waveguides. The lensing features may comprise or consist of cavities, such as filled with ambient gas; inserts, wherein the lensing feature consists or comprises a solid material having a different index of refraction with respect to the waveguides; cut-outs, wherein parts of the waveguide have been removed. Cut-outs may be described as cavities having an opening at an end of the waveguides, typically wherein said end is towards the gap.

As used herein, the term subwavelength refers to a component having a dimension, typically in the plane of propagation of light of the waveguide, shorter than the shortest wavelength of the light employed. Thereby, for an in-plane photonic device configured for receiving and transmitting, or receiving and transmitting, light comprising or consisting a wavelength of 1550 nm, the subwavelength features are below this length. It should be noted that the subwavelength features may have an irregular shape, typically, the important length, for defining whether the feature is subwavelength, is the smallest dimension of the feature, in the plane of propagation of light of the waveguide.

Typically, the subwavelength feature has a dimension, in the plane and/or direction of propagation of the light, that is below the wavelength of the light, such as the major wavelength of said light, i.e. the one with the highest intensity, and/or all wavelengths of the light.

Configuration of the Ends

In one embodiment of the present disclosure the input optical waveguide(s) comprise one or more input end(s) and one or more input gap end(s) and the output optical waveguide(s) comprise one or more output gap end(s) and one or more output ends, wherein the input gap end(s) interface the output gap end(s).

In one embodiment of the present disclosure the input and the output gap ends are substantially planar.

In one embodiment of the present disclosure the input and the output gap ends are substantially parallel.

In one embodiment of the present disclosure the input and the output gap ends have substantially the same area.

In one embodiment of the present disclosure the input and the output gap ends have substantially the same shape.

In one embodiment of the present disclosure the input and the output gap ends are substantially rectangular.

In one embodiment of the present disclosure the input and the output gap ends each have an area between 1000 $nm^2$ and 100 $\mu m^2$. Preferably the area is scaled according to the wavelength of the optical signal, wherein an optical signal with a 400 nm wavelength may have gap ends with a cross sectional area of 64 nm×258 nm while at 20 μm wavelength, scaling results in a cross sectional area of 3.2 μm×12.9 μm.

Electrical Isolation Gap—Electrical Properties

In one embodiment of the present disclosure the electrical resistance between the input and the output optical waveguide is at least 1 kΩ, such as at least 10 kΩ, such as at least 100 kΩ, such as at least 1 MΩ, such as at least 10 MΩ, such as at least 100 MΩ, such as at least 1 GΩ, such as at least 10 GΩ, such as at least 100 GΩ, such as at least 1 TΩ, such as at least 10 TΩ.

In one embodiment of the present disclosure the electrical resistance between the input and the output optical waveguide is at least 1 kΩ, more preferably at least 10 kΩ, yet more preferably at least 100 kΩ, even more preferably at least 1 MΩ, most preferably at least 10 MΩ, such as at least 100 MΩ, such as at least 1 GΩ, such as at least 10 GΩ, such as at least 100 GΩ, such as at least 1 TΩ, such as at least 10 TΩ.

Wires

In one embodiment of the present disclosure the input and/or the output optical waveguide comprise one or more wires, forming a connection between the waveguide(s) and one or more bulk materials in proximity of the waveguide(s), in particular for forming an electrical connection between the waveguide(s) and one or more bulk materials in proximity of the waveguide(s).

The bulk material may be provided in the same material as one or both waveguides. The bulk material may, additionally to the waveguides, be the remnant of a layer from which the in-plane photonic device has been formed. Alternatively or additionally, bulk materials may be formed prior to and/or following formation of the waveguides, and may be provided in material other than the material(s) of the waveguides. The bulk material may surround the optical waveguides, and may form an electrical isolation trench.

In one embodiment of the present disclosure, at least part of the input and/or the output optical waveguide is a suspended structure, such as suspended by a suspension system. The suspension system may comprise or consist of a number of wires that contacts any part of the input and/or the output optical waveguide. The suspension system is preferably configured to suspend the input and/or the output optical waveguide. The suspension system preferably comprises wires configured to suspend the input and/or the output optical waveguide, or parts thereof, from one or more structures, such as one or more bulk material.

The input and/or the output optical waveguide may be formed by etching of for example a silicon layer such that the waveguides are suspended in a trench. The trench may be surrounded by unetched material. In a particular embodiment of the present disclosure, the input and/or the output optical waveguide is, at least partly, suspended from bulk material, such as unetched material. However, bulk material may comprise or consist of other material(s) than the waveguide(s). The bulk material may have been formed separately to forming the waveguide. The bulk material may be a planar structure. The bulk material may have a top surface that is substantially parallel to, and in the same height as, the top surface of the input and/or the output optical waveguide such as the top surface of the bulk material that suspends, through the wire(s) the input and/or the output optical waveguide.

In a preferred embodiment of the present disclosure, one or more wires contact the input and/or the output optical waveguide along a contact length, and wherein said contact length typically is below the wavelength of the optical signal, such as all wavelengths of the optical signals and/or the highest intensity wavelength of the optical signal.

In a preferred embodiment of the present disclosure, the contact length is shorter than 10 µm, more preferably shorter than 5 µm, yet more preferable shorter than 1 µm, yet even more preferable shorter than 500 nm, most preferable shorter than 200 nm.

In an embodiment of the present disclosure, the contact length is the length along which the one or more wires contact the input and/or the output optical waveguide, in the direction of the propagation of light and/or in the direction of the input and/or the output optical waveguide.

In an embodiment of the present disclosure, the contact length is the length along which the one or more wires contact the input and/or the output optical waveguide, such as in any direction of the contact area between said one or more wires and the input and/or the output optical waveguide.

In an embodiment of the present disclosure, the suspension system is configured to suspend the input and/or the output optical waveguide and to provide an electrical connection across the input and/or the output optical waveguide. Preferably the suspension of the waveguide, and the electrical connection across the same is provided by at least one wire contacting the waveguide and the bulk material on both sides of the waveguide.

In one embodiment of the present disclosure the wire(s) are configured to provide mechanical stability to the optical waveguide(s), such as by forming a suspension system. In a preferred embodiment wherein at least one of the waveguides is suspended, such as suspended in a fluid, such as gas, such as air, the wire(s) may form a suspension system that, at least partly, suspends said at least one optical waveguide.

In an embodiment of the present disclosure any, or all, of the input optical waveguide and/or any, or all, of the output optical waveguides are suspended slot waveguides. The suspended slot waveguides may comprise wires forming a physical connection between the slot waveguide and the surrounding material, i.e. the bulk material.

In a specific embodiment of the present disclosure, the in-plane photonic device comprises a first bulk material located on both sides of the input optical waveguide, and wherein each is contacted by at least one wire, such that the input slot waveguide(s) is suspended, such as in an ambient gas. Said wires preferably form an electrical connection between the first bulk material on both sides of said waveguide.

In a specific embodiment of the present disclosure, the in-plane photonic device comprises a second bulk material located on both sides of the output optical waveguide, and wherein each is contacted by at least one wire, such that the output slot waveguide(s) is suspended, such as in an ambient gas. Said wires preferably form an electrical connection between the second bulk material on both sides of said waveguide. It is a preference that the first and the second bulk material is substantially electrically isolated from each other, such as electrically isolated from each other.

In one embodiment of the present disclosure wire(s) are configured to provide an electrical connection between the waveguide(s) and the bulk material(s), such as by being provided in an electrically conductive material. The wire(s) may be formed in the same material as the waveguide and/or the bulk material, or it may be formed in a separate material. Additionally, the wire(s) may be doped to improve their electrical conductivity.

In one embodiment of the present disclosure the wires together with the waveguide(s) are configured to provide an electrical connection between two or more bulk materials. The waveguide may comprise two or more wires that contact two or more separate bulk materials that, additional to the electrical connection provided by the wires and the waveguide, do not have a substantial electrical connection. The wires are therefore preferably formed between bulk materials, on either side of the waveguide, between which, electrical connection(s) is desired. The in-plane chip-scale photonic device may therefore be seen as an in-plane chip-scale electro-photonic circuit crossing.

In one embodiment of the present disclosure the presently disclosed in-plane photonic crossing the input optical waveguide forms an electrical connection between different bulk materials than the output optical waveguide.

In one embodiment of the present disclosure the one or more wires has a larger contacting region with the bulk material than with the input and/or output optical waveguide. The reflectivity and transmission of the optical signal depend to a large extent on the size of the wire(s) at the point of contact to the optical waveguide(s). Wherein a smaller point of contact, such as a size below the wavelength, is preferred. Therefore in order to provide increased mechanical stability and/or reduced electrical resistance, to for example a suspended waveguide, and decreased reflectivity and increased transmission of the optical signal the wire can expand towards the contacting surrounding bulk material. Furthermore, multiple subwavelength size wires can be used in order to achieve a similar effect. The subwavelength wire can have identical or different contacting regions with the bulk material than with the input and/or output optical waveguide. Consequently, a subwavelength grating comprising multiple wires, on one or both sides of the optical waveguide(s), may be used to suppress reflectivity, improve transmission, minimize the effect on the modes, and/or to provide sufficient mechanical stability, to for example a suspended waveguide. Typically, the subwavelength wires and/or gratings have a dimension, in the direction of propagation of light, that is below the wavelength of the light, such as the major wavelength, i.e. the one with the highest intensity, of the light and/or all wavelengths of the light.

In one embodiment of the present disclosure at least a subset of the wires are provided in pairs, positioned on the same waveguide and contacting the bulk material on each side of said waveguide.

In one embodiment of the present disclosure the pairs of wires, positioned on the same waveguide, are configured for providing an electrical connection, such as by being provided in an electrically conductive material, such as wherein the electrical connection(s) has lower electrical resistance than the gap, between the bulk material on each side of said waveguide.

In one embodiment of the present disclosure the electrical connection formed by a wire has lower electrical resistance than the electrical isolation gap, such as less than about one-tenth of the resistance, such as less than about one-hundredth of the resistance, such as less than about one-thousandths of the resistance, such as less than about one-ten thousandths of the resistance.

The input and the output optical waveguide may be mirror symmetric with the mirror plane defined by the center of the gap. Alternatively, the device does not exhibit mirror symmetry, or a partial symmetry, such as wherein the waveguides have a symmetry plane but wherein the wires and/or the lensing features do not have a symmetry plane.

Gap Angle

In one embodiment of the present disclosure the plane of the gap forms a gap angle to the direction of propagation of the optical signal. The gap between the input optical waveguide and the output optical waveguide may be substantially planar. The plane may form an angle with respect to the direction of propagation of the optical signal.

In one embodiment of the present disclosure the gap angle is substantially $\pi/2$ rad. Consequently, the plane of the gap is perpendicular to the direction of propagation of the optical signal.

In another embodiment of the present disclosure the gap angle is between $\pi/180$ and $\pi/2$ rad. Thereby, the plane of the electrically isolation gap is not perpendicular to the direction of propagation of the optical signal. This may for example be true for an input and an output optical waveguides narrowing towards the gap, wherein the waveguides overlap along the axis of propagation of the optical signal.

In one embodiment of the present disclosure the gap is formed such that it is angled with respect to the general propagation direction of the optical signal, in the in-plane photonic device.

Materials

In one embodiment of the present disclosure the in-plane photonic device consists of or comprises a conductive material. Preferably the material has suitable electrical, thermal and optical properties.

In one embodiment of the present disclosure the in-plane photonic device consists of or comprises a material selected from the list including silicon, indium phosphide, gallium arsenide, silicon carbide, silicon nitride, aluminum gallium arsenide, silicon oxide, silicon oxynitride, gallium nitride or combinations thereof, such as mixes, alloys, oxides, or digital alloys, wherein the material further may be doped.

In one embodiment of the present disclosure the in-plane photonic device is, at least partly, provided as silicon-on-insulator, i.e. provided as a silicon on a buried silicon dioxide layer, or as silicon-on-sapphire, wherein sapphire (crystalline alumina) is an insulating material.

In one embodiment of the present disclosure the input and the output optical waveguides are provided on an insulator, such as wherein the insulator is selected from the list including air, vacuum, silicon dioxide, silicon oxides, polymers, ceramics, such as alumina, titania, hafnia, and/or a combination thereof.

In one embodiment of the present disclosure the input and the output optical waveguides are embedded in an insulator, such as wherein the insulator is selected from the list including air, vacuum, silicon dioxide, silicon oxides, polymers, ceramics, such as alumina, titania, hafnia, and/or a combination thereof.

In one embodiment of the present disclosure the in-plane photonic device consists of or comprises a material with a refractive index between 1.1 and 4.0, such as between 1.5 and 4.0, such as between 2.5 and 4.0, such as between 3.25 and 3.75, such as between 3.4 and 3.6.

Manufacturing

In one embodiment of the present disclosure the in-plane photonic device has been fabricated, at least partly, by micro- and nanolithography methods selected from the list including electron-beam lithography, ion-beam lithography, ion-beam milling, laser-cutting, nano-imprint lithography, ultraviolet lithography, deep ultraviolet lithography, extreme ultraviolet lithography, proton-beam lithography, nanoscribe, X-ray lithography, (Talbot) interference lithography, magnetolithography, scanning probe lithography or neutral particle lithography, such as 3D printing.

In one embodiment of the present disclosure, the configuration of said device has been designed by a mathematical method, such as by topology optimization.

DETAILED DESCRIPTION OF DRAWINGS

The invention will in the following be described in greater detail with reference to the accompanying drawings. The drawings serve as examples and are intended to illustrate some of the features of the presently disclosed photonic device, and are not to be construed as limiting to the presently disclosed invention.

Figure 1A:
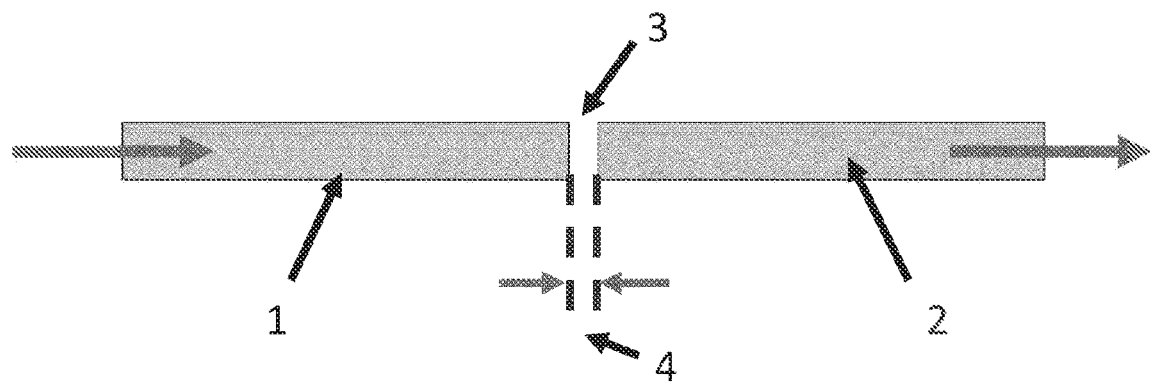
FIG. 1A shows an input and an output optical waveguides separated by a gap, which provides both electrical, mechanical and thermal isolation between the waveguides.
Figure 1B:
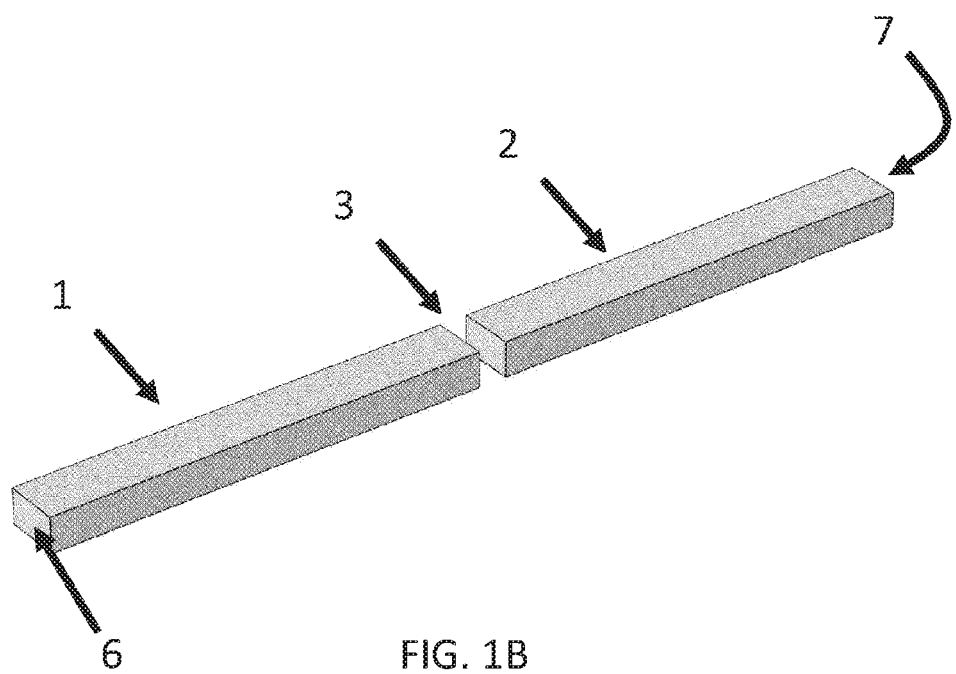
FIG. 1B shows a perspective view of an input and an output optical waveguide separated by an electrical, thermal and mechanical isolation gap.
Figure 1C:
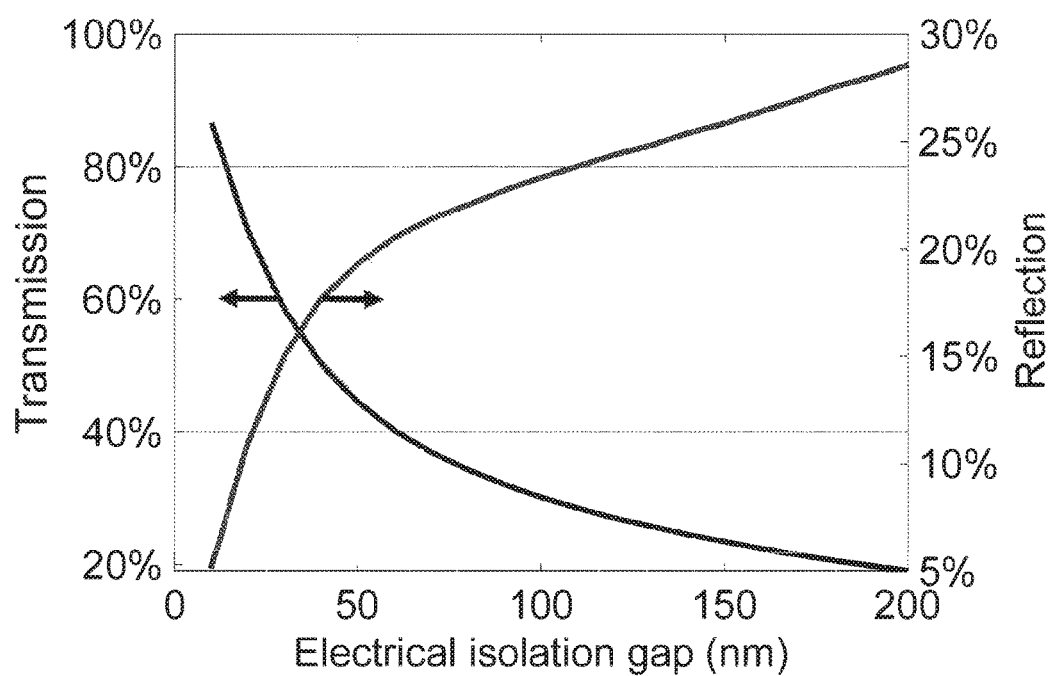
FIG. 1C shows typical calculated values of the transmission and the reflection of the optical signal at various gap distances of a photonic device similar to the photonic device in FIG. 1A-B.

FIG. 1A shows an in-plane chip-scale photonic device comprising an input (1) and an output (2) optical waveguides separated by a gap (3). A similar device is shown in FIG. 1B in perspective view, herein the planar gap end of the output optical waveguide can be seen. FIG. 1C shows the typical calculated reflection and transmission values of a device similar as the device shown in FIG. 1A-B, at varying gap sizes (4). As can be seen in the figure the transmission decreases with increasing gap sizes, while the reflectivity increases with increasing gap sizes. At a gap size of around 50 nm the transmission of the optical signal, from the input waveguide to the output waveguide, is approximately 45% while the reflectivity is approximately 20%.

Figure 2A:
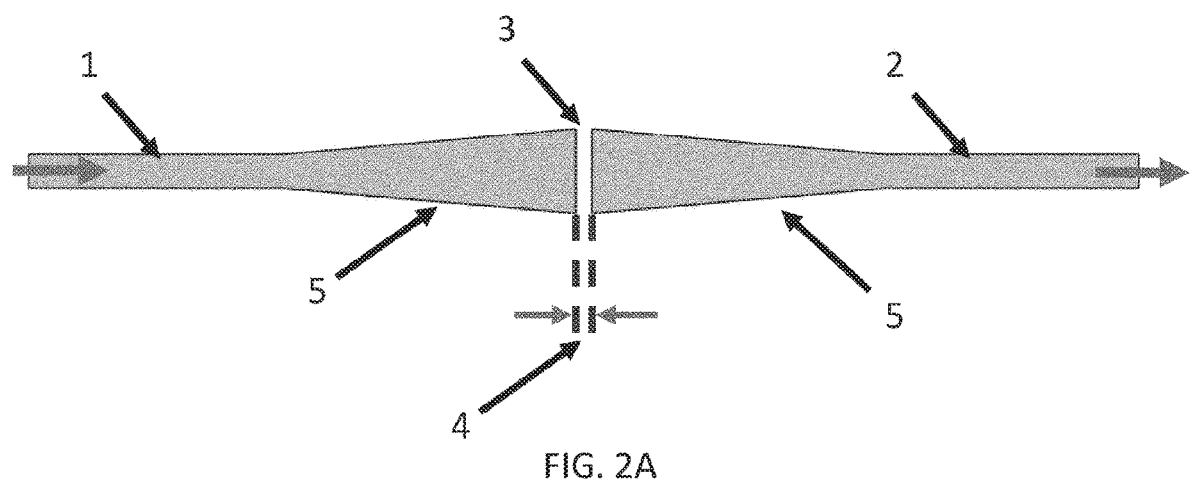
FIG. 2A shows an input and an output optical waveguides having widenings near the gap.
Figure 2B:
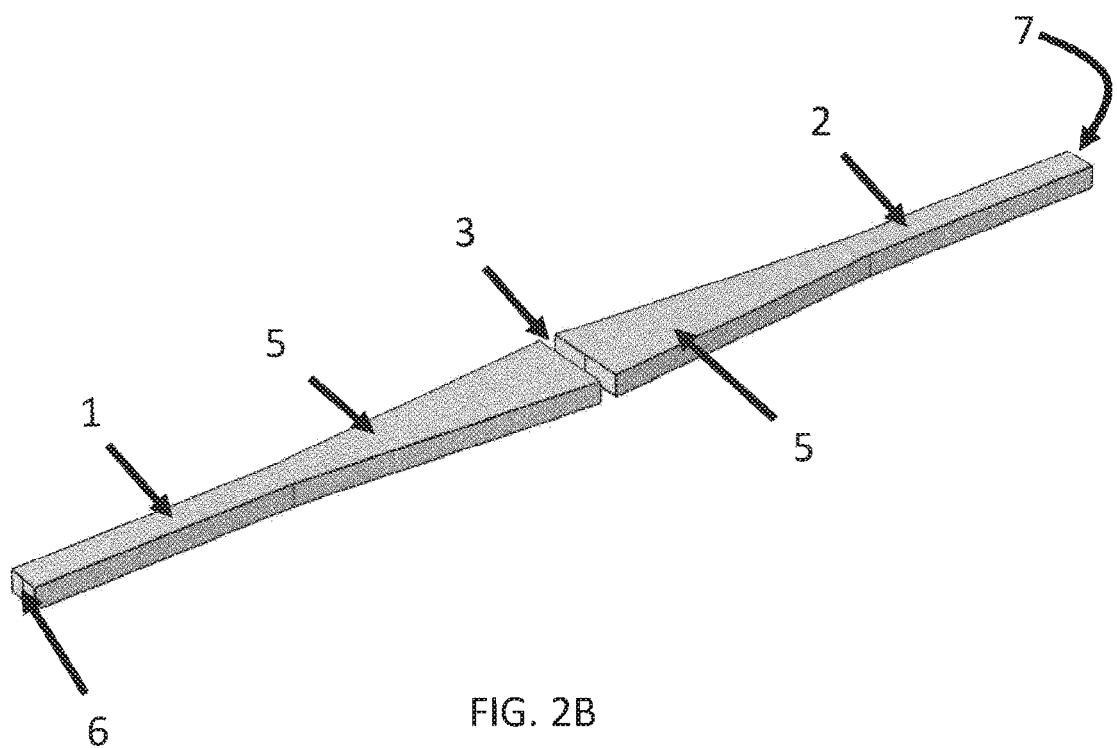
FIG. 2B shows a perspective view of an input and an output optical waveguides having widenings near the gap.
Figure 2C:
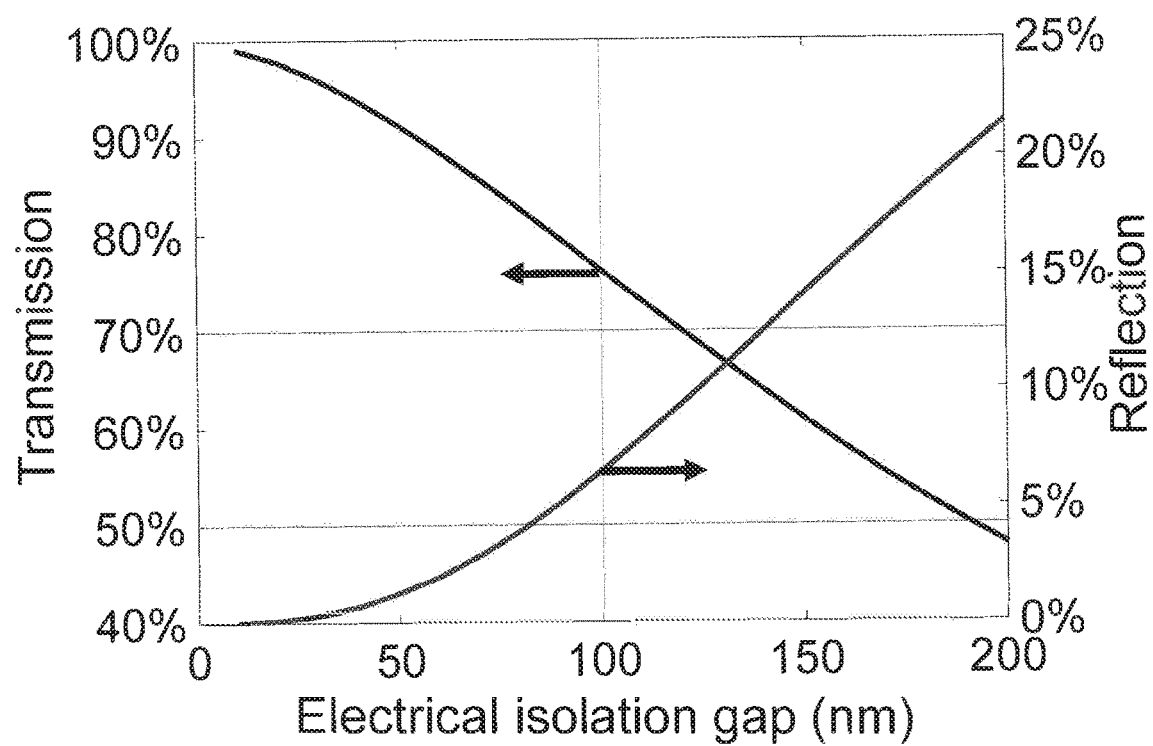
FIG. 2C shows typical calculated values of the transmission and the reflection of the optical signal at various gap distances of a photonic device similar to the photonic device in FIG. 2A-B.

FIG. 2A shows an input (1) and an output (2) optical waveguides having mode converters (5) in the form of widenings towards the gap (3). The widening of the input optical waveguide may be configured for expansion of the optical mode propagating in the input optical waveguide, while the widening of the output optical waveguide is preferably configured for shrinking of the optical mode of the optical signal propagating in the output optical waveguide. The same device is shown in FIG. 2B in a perspective view of an input and an output optical waveguides having widenings towards the gap. FIG. 2C shows the typical calculated reflection and transmission values of a device similar as the device shown in FIG. 2A-B, at varying gap sizes (4). At a gap size of around 50 nm the transmission of the optical signal, from the input waveguide to the output waveguide, is above 90% while the reflectivity is approximately 2%. The increase in transmission, and decrease in reflectivity, as compared to the device in FIG. 1, is enabled by optical mode matching across the gap. Exemplified in this figure by mode converters, in the form of widenings towards the gap.

Figure 3A:
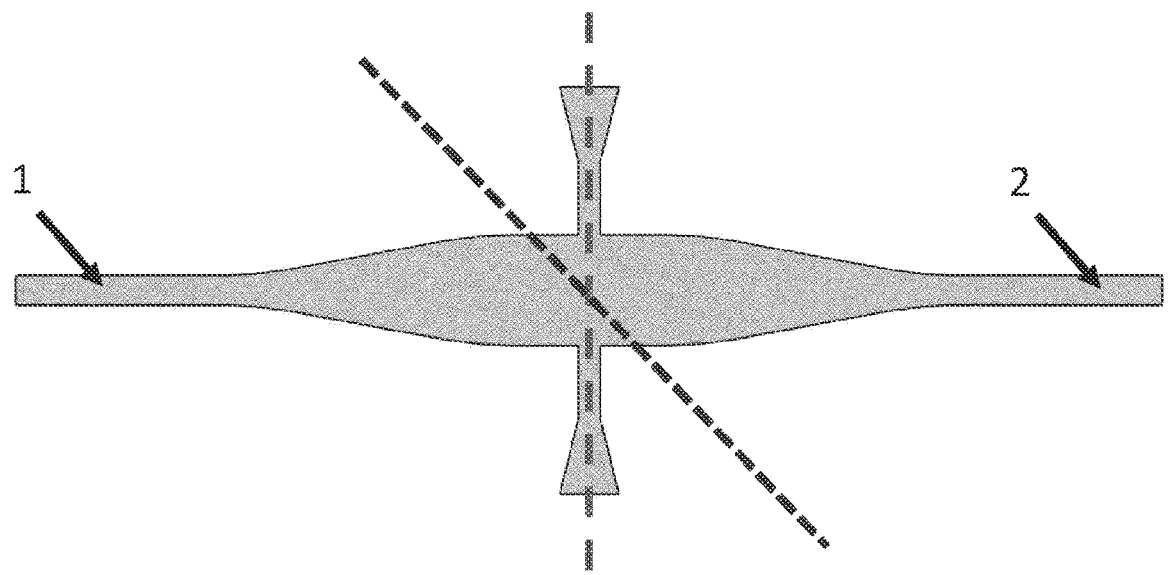
FIG. 3A shows exemplary lines indicating low-loss cuts for formation of a gap.
Figure 3B:
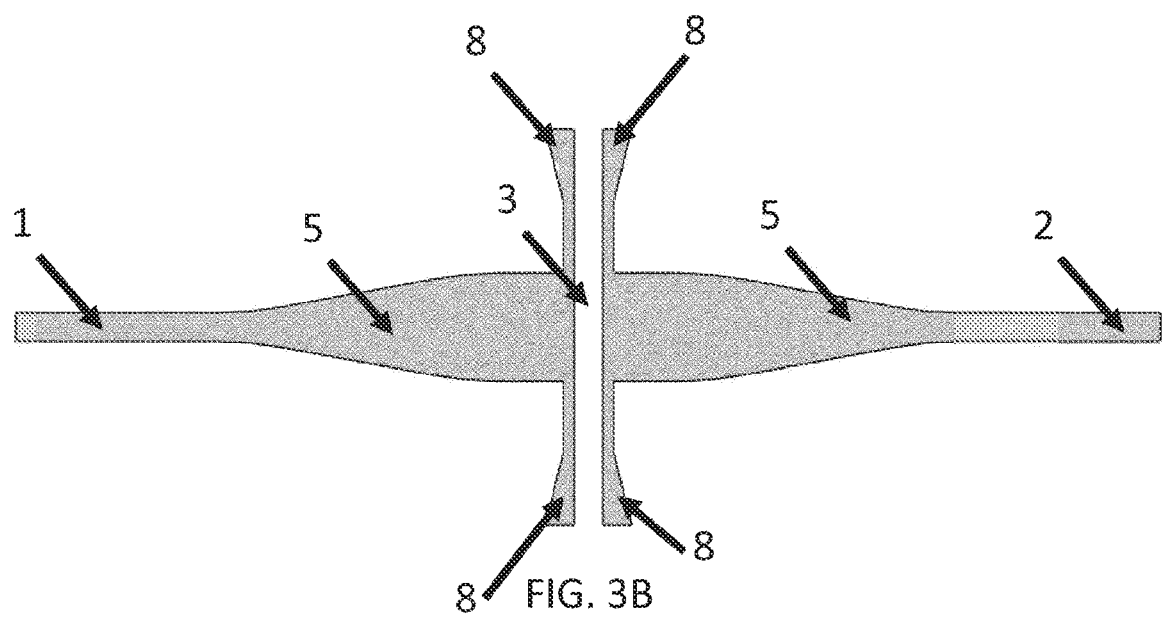
FIG. 3B shows an input and an output optical waveguide resulting from a cut according to the red line in FIG. 3A, the waveguides comprising wires in contact with the surrounding bulk materials.
Figure 3C:
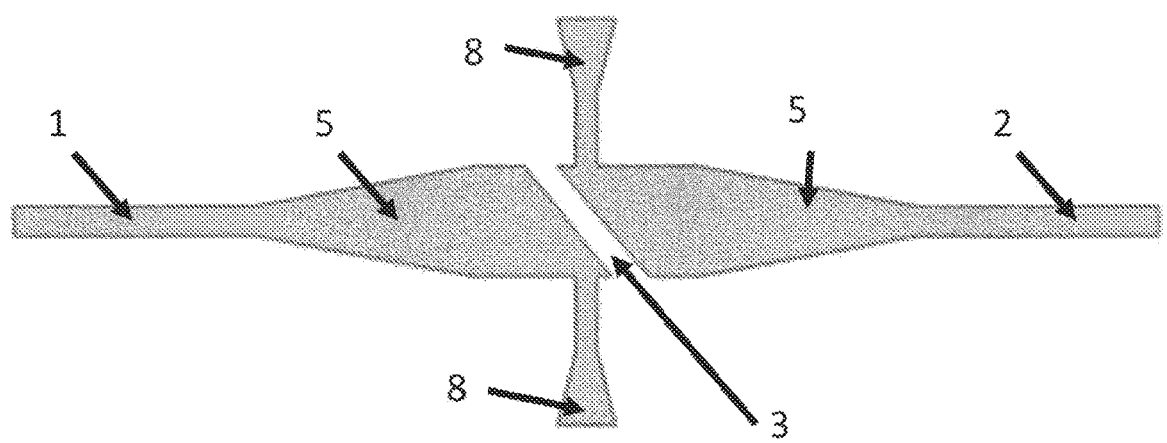
FIG. 3C shows an input and an output optical waveguide resulting from a cut according to the black line in FIG. 3A, the waveguides comprising wires in contact with the surrounding bulk materials.

FIG. 3A shows examples of lines indicating low-loss, i.e. high transmission and low reflectivity, cuts for formation of a gap. FIG. 3B shows an input and an output optical waveguide resulting from a cut according to the red dashed line in FIG. 3A. This in-plane chip-scale photonic device comprises mode converters, widening towards the gap, for decreased loss, and furthermore wires (8) for contacting the surrounding bulk materials. The wires may provide mechanical stability for suspended waveguides, and furthermore the wires may provide an electrical connection between the surrounding bulk on either side of the waveguide, given that the wire and the waveguide are provided in a conductive material. Similarly, FIG. 3C shows an input and an output optical waveguide resulting from a cut according to the black dashed line in FIG. 3A. The in-plane chip-scale photonic device comprise mode converters on both the input and the output waveguide, narrowing towards the gap. The waveguides can be described as partially overlapping in the direction of propagation of the optical signal. Furthermore, the wires are provided on opposite sides for the input and the output waveguide, ensuring that no electrical connection is provided between the surrounding bulk on either side of the waveguides, while at the same time providing mechanical stability to both waveguides.

Figure 3D:
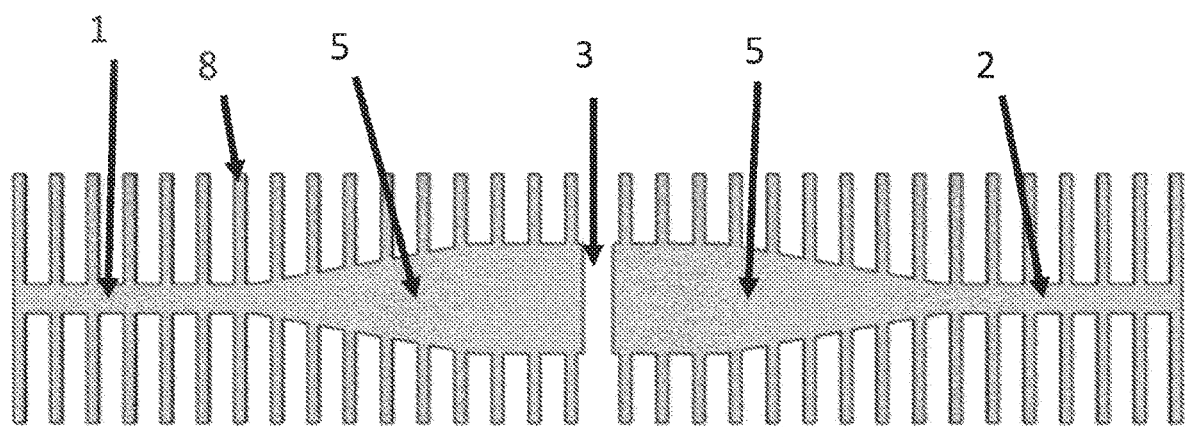
FIG. 3D shows an input and an output optical waveguide resulting from a cut similar to FIG. 3B, with the input and output optical waveguides comprising multiple thin wires (grating) contacting the surrounding bulk materials.

FIG. 3D shows a photonic device comprising mode converts, expanding towards the gap, comprising multiple narrow wires for contacting the surrounding bulk material. In addition to being important for the mechanical stability and the electrical connection across different parts of an electro-photonic chip comprising the waveguides, the wires (8) may furthermore assert an effect on the optical modes. In order to minimize this effect the wires may be provided as a subwavelength grating, resulting in decreased effects on the optical modes, while maintaining mechanical stability and electrical connection between the contacting parts.

Figure 4:
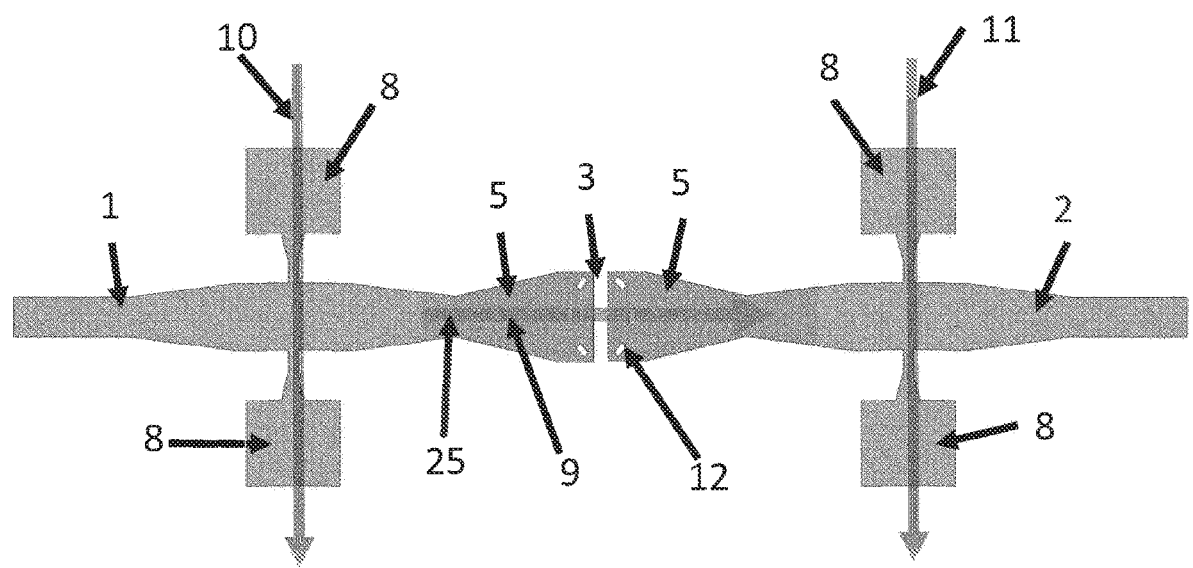
FIG. 4 shows an input and an output optical waveguide for transmission of an optical signal from the input optical waveguide to the output optical waveguide, wherein both waveguides comprise wires forming a physical, and preferably also electrical, connection to the surrounding bulk material.

FIG. 4 shows a schematic illustration of a photonic device. It consists of a suspended single-mode waveguide, as the optical link, divided into two parts, an input waveguide and an optical mode matching region and an output waveguide and an optical mode matching region, separated by a gap. The isolation gap prohibits the electrical current (10, 11) from flowing through the waveguide and thus a short circuit between alongside electrical links. The waveguide remains suspended using wires, formed in silicon. The wires are configured for providing sufficient mechanical stability to the suspended waveguides. Each wire is accompanied with a mode converter, expanding towards the gap, to reduce the optical loss due to the waveguides/wires intersection.

Figure 5:
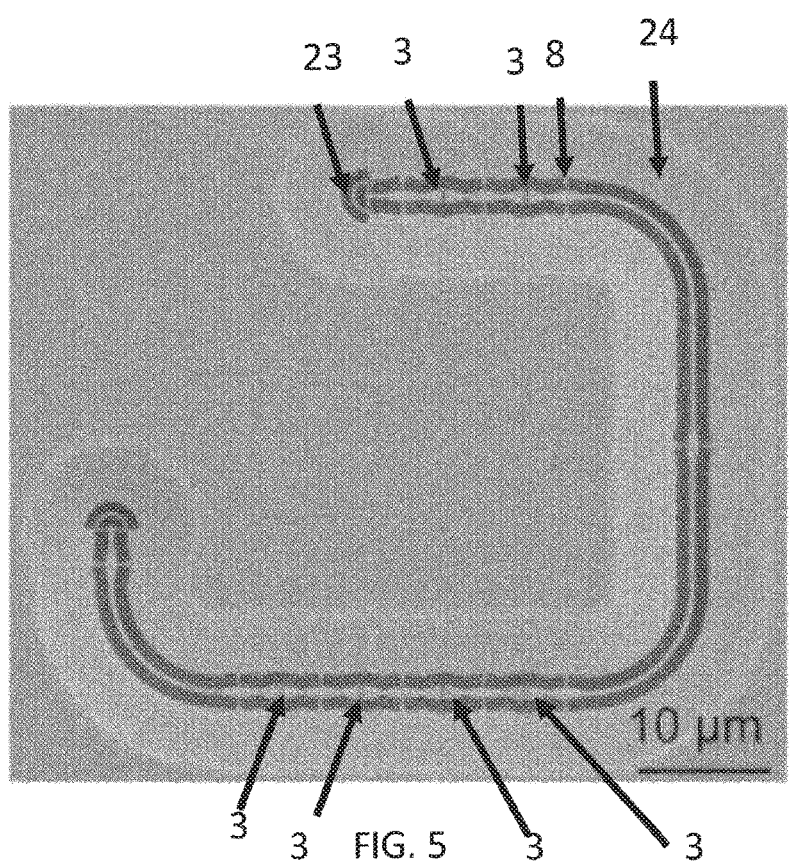
FIG. 5 shows a scanning electron micrograph of a photonic circuit comprising six separate electro-photonic circuit crossings (EPCC)

FIG. 5 shows a scanning electron micrograph of a photonic circuit comprising multiple photonic devices, in the form of electro-photonic circuit crossings (EPCC), fabricated to investigate the performance of the EPCCs. The fabricated device comprises six EPCCs, each comprising a gap (3), 20 silicon wires (8), and two crossed input/output couplers (23). The position and number of wires are selected to ensure that the whole circuit remains suspended.

Figure 6A:
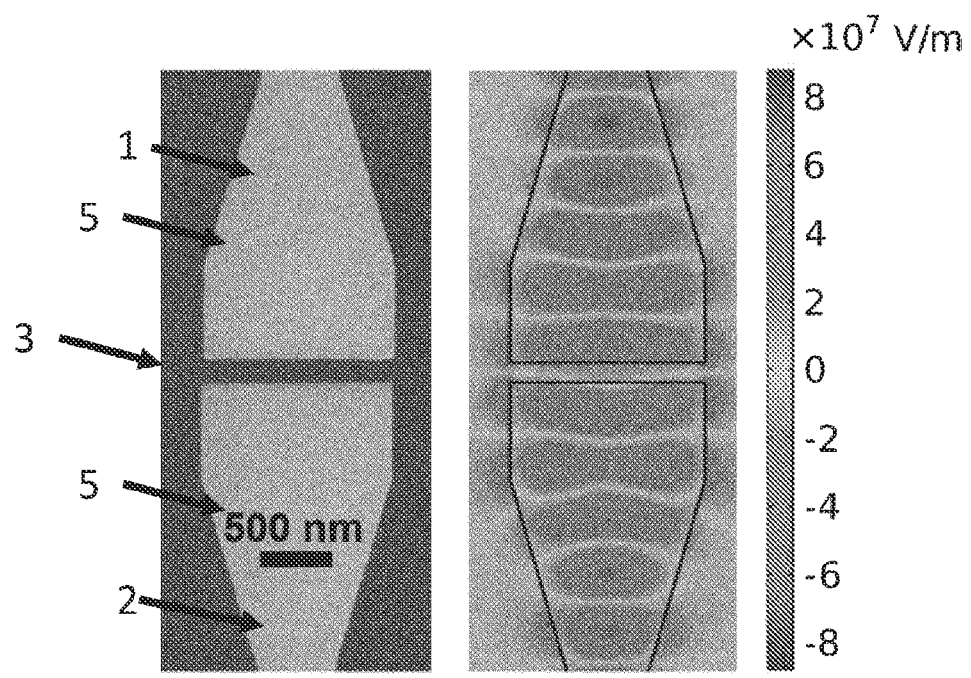
FIG. 6A shows an electro-photonic circuit crossing comprising an input and an output optical waveguide comprising widening near, such as towards, the gap together with the calculated field distribution for transverse electric polarization.
Figure 6B:
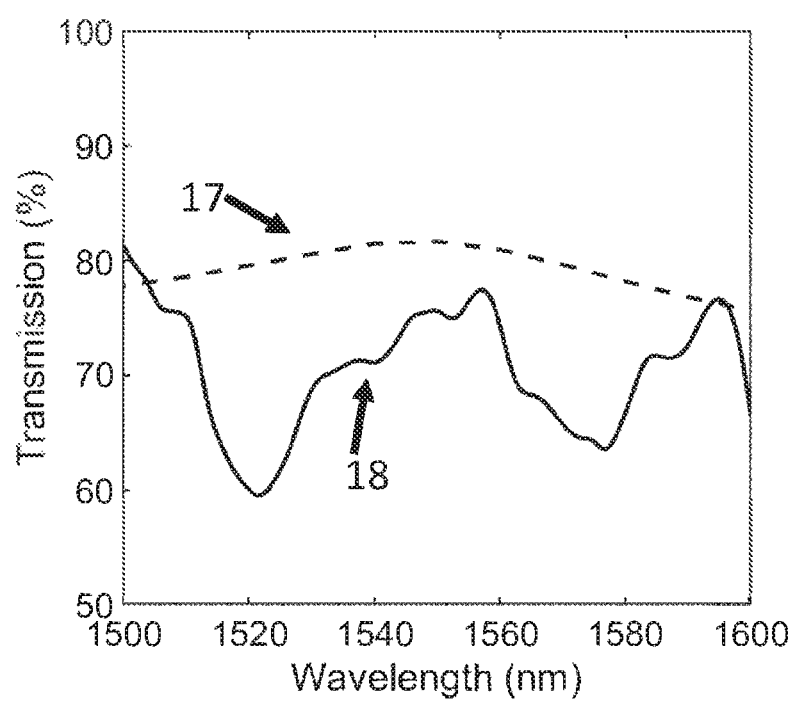
FIG. 6B shows a measured transmission spectrum (solid line) together with the theoretical prediction (dashed line) for the photonic device given in FIG. 6A, comprising widenings near the gap.

FIG. 6A shows a device enabling transmission of light through the waveguides (light grey; left panel) while ensuring electrical isolation by the etched trench and the electric field of light propagating across the gap (right panel). FIG. 6B shows the optical transmission calculated (dashed line) and measured (solid line).

Figure 7A:
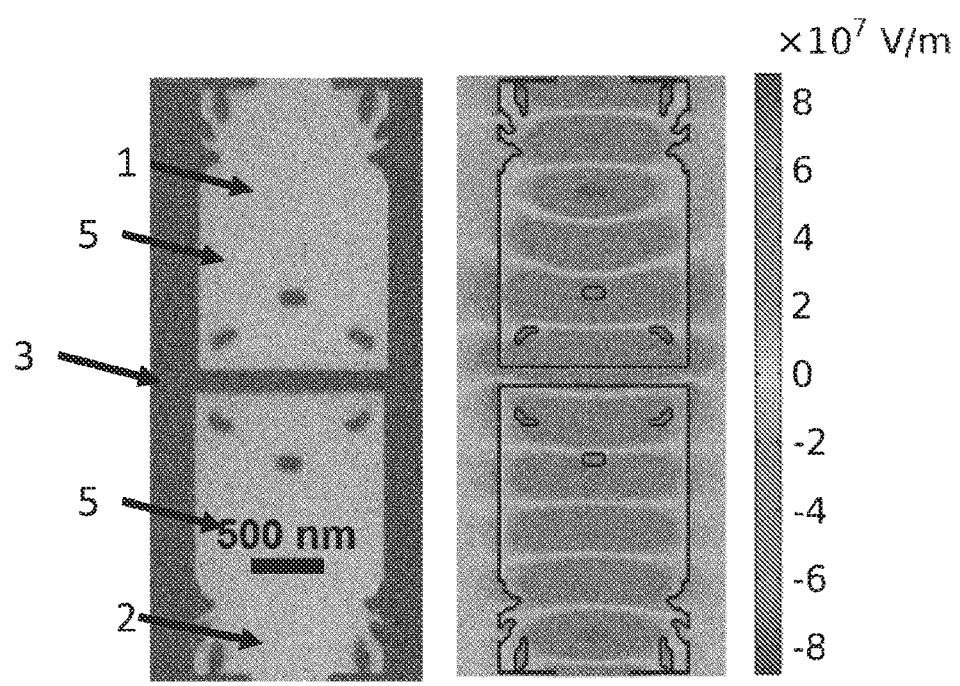
FIG. 7A shows an electro-photonic circuit crossing comprising an input and an output optical waveguide, with a configuration generated by topology optimization, comprising widening of the optical mode and lensing and/or mode matching features, together with the calculated field distribution for transverse electric polarization.
Figure 7B:
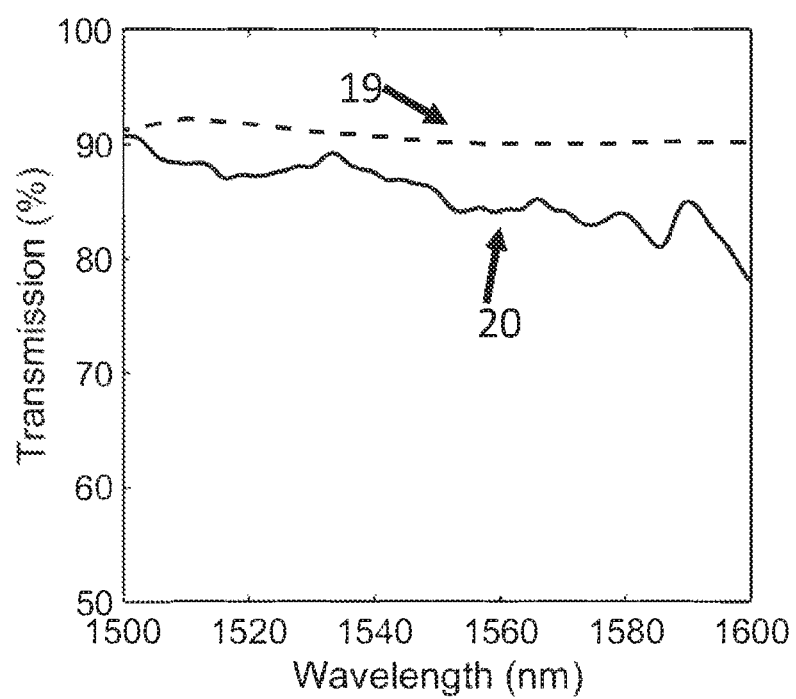
FIG. 7B shows a measured transmission spectrum (solid line) together with the theoretical prediction (dashed line) for an input and an output optical waveguide having a topology optimized configuration as illustrated in FIG. 7A, comprising widenings and lensing and/or mode matching features near the gap.

FIG. 7A shows a device enabling transmission of light through the waveguides (light grey; left panel) while ensuring electrical isolation by the etched trench and the electric field of light propagating across the gap (right panel). FIG. 7B shows the optical transmission calculated (dashed line) and measured (solid line).

Figure 8A:
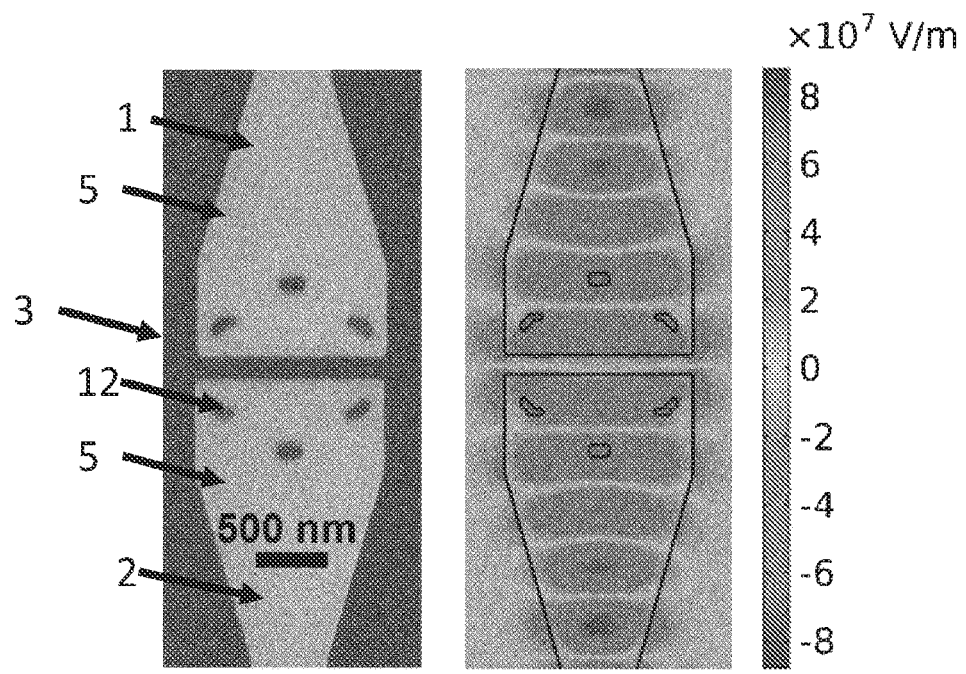
FIG. 8A shows a scanning electron micrograph of an electro-photonic circuit crossing comprises an input and an output optical waveguide, comprising widenings near the gap and lensing and/or mode matching features, together with the calculated field distribution for transverse electric polarization.
Figure 8B:
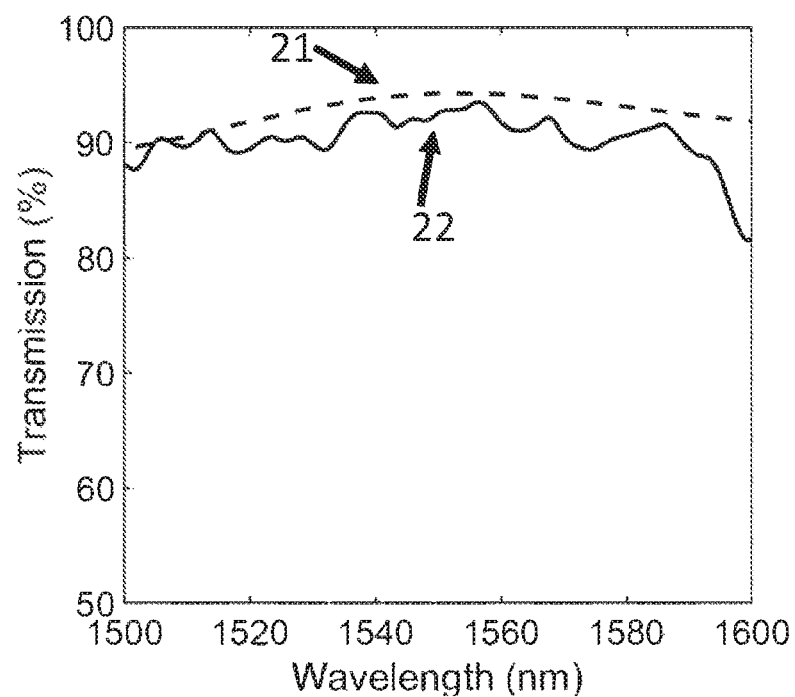
FIG. 8B shows a measured transmission spectrum (solid line) together with the theoretical prediction (dashed line) for an input and an output optical waveguides, given in FIG. 8A, comprising widenings near the gap and lensing and/or mode matching features.

FIG. 8A shows a device enabling transmission of light through the waveguides (light grey; left panel) while ensuring electrical isolation by the etched trench and the electric field of light propagating across the gap (right panel). FIG. 8B shows the optical transmission calculated (dashed line) and measured (solid line).

FIG. 9A shows an input and an output optical waveguide comprising a topology optimized design wherein the photonic device has been restricted to features, such as the lensing features (12), above 100 nm, making it suitable for clean room processing methods such as deep UV lithography. FIG. 9B shows calculated transmission (21) and reflection (22) spectra for the design given in FIG. 9A. As can be seen, the transmission stays above 74% over 100 nm bandwidth centered at 1610 nm. The reflection stays below 7% over the same range of wavelengths. The result thereby indicates that it is possible to achieve photonic devices, suitable for deep UV lithography, with only minor degradation of the transmission and reflection.

FIG. 10A-B shows input and output optical waveguides comprising wires (8) that contact the surrounding bulk material (24), wherein the wires act to suspend the waveguides. The more robust wires (8) of FIG. 10B, comprising a widening towards the surrounding bulk material, act to prevent short-circuit and increased transmission between the optical waveguides.

Items
1. An in-plane photonic device comprising:
    one or more input optical waveguides; and
    one or more output optical waveguides;
    wherein the input and the output optical waveguides are positioned such that a gap between them electrically isolates the input and the output optical waveguides and wherein the input and the output optical waveguides are configured for optical mode matching across the gap, such that an optical signal can be transmitted from the input optical waveguide to the output optical waveguide across the gap.
2. The in-plane photonic device according to any one of the preceding items, wherein said device is configured for an optical signal with a wavelength in the range between 400 nm and 20 µm, such as in the range between 600 nm and 10 µm, such as in the range between 800 nm and 5 µm, such as in the range between 1000 nm and 2 µm, such as in the range between 1300 nm and 1700 nm, such as at or around 1550 nm.

Gap Size

3. The in-plane photonic device according to any one of the preceding items, wherein the gap size, such as the distance between the input and the output optical waveguide, is between $\lambda/200$ and $\lambda/5$, and where $\lambda$ is the shortest wavelength of the optical signal.
4. The in-plane photonic device according to any one of the preceding items, wherein the gap size is between about 10 nm and 2000 nm.

Transmission

5. The in-plane photonic device according to any one of the preceding items, wherein said device is configured for transmitting the optical signal, from the input optical waveguide to the output optical waveguide, with a transmission of at least 50%, such as at least 60%, such as at least 70%, such as at least 80%, such as at least 90%, such as at least 95%, such as at least 97%, such as at least 99%.

Reflection

6. The in-plane photonic device according to any one of the preceding items, wherein said device is configured for reflecting below 50%, such as below 40%, such as below 30%, such as below 20%, such as below 10%, such as below 5%, such as below 3%, such as below 1% of the input optical signal, such as the intensity of the optical signal received by the input optical waveguide.

Mode Matching

7. The in-plane photonic device according to any one of the preceding items, wherein said device is configured for increased optical transmission by, at least in part, optical mode matching between the modes in the input and the output optical waveguides.
8. The in-plane photonic device according to any one of the preceding items, wherein said device is configured for decreased optical reflectivity by, at least in part, optical mode matching between the modes in the input and the output optical waveguides.
9. The in-plane photonic device according to any one of the preceding items, wherein said device is configured for optical mode matching between the input and the output optical waveguides, by, at least partly, narrowing of the waveguide(s) near the gap.
10. The in-plane photonic device according to any one of the preceding items, wherein said device is configured for optical mode matching between the input and the output optical waveguides, by, at least partly, widening of the waveguide(s) near the gap.
11. The in-plane photonic device according to any one of the preceding items, wherein the input and the output optical waveguides are mirror symmetric with the mirror plane defined by the center of the gap.
12. The in-plane photonic device according to any one of the preceding items, wherein the input and/or the output optical waveguide is a slot waveguide.

Mode Converters

13. The in-plane photonic device according to any one of the preceding items, wherein each waveguide comprise a mode converter, for optical mode matching, near the gap, the mode converter being a widening or a narrowing near the gap.
14. The in-plane photonic device according to item 13, wherein the mode converters are configured for adjusting the optical mode, such as to expand and/or to shrink the optical mode of the optical signal.
15. The in-plane photonic device according to any one of items 13-14, wherein the mode converter of the input optical waveguide is configured for expanding the optical mode and the mode converter of the output optical waveguide is configured for shrinking the optical mode.
16. The in-plane photonic device according to any one of items 13-15, wherein the mode converter of the input optical waveguide is configured for shrinking the optical mode and the mode converter of the output optical waveguide is configured for expanding the optical mode
17. The in-plane photonic device according to any one of items 13-16, wherein the mode converters widen or narrow near the gap according to a function, such as a linear function, a parabolic function, and/or an elliptic function.

Lensing

18. The in-plane photonic device according to any one of the preceding items, wherein said device is configured for lensing of the optical signal across the gap, such as from the input optical waveguide to the output optical waveguide.
19. The in-plane photonic device according to any one of the preceding items, wherein said device comprises one or more lensing features, for lensing of the optical signal across the gap.
20. The in-plane photonic device according to any one of the preceding items, wherein the lensing features have a different refractive index than the material of the input and/or the output optical waveguides.
21. The in-plane photonic device according to any one of the preceding items, wherein said device is configured for lensing of an expanded mode of the optical signal, such as for increased transmission across the gap.
22. The in-plane photonic device according to any one of the preceding items, wherein said device is configured for lensing of a shrunken mode of the optical signal, such as for increased transmission across the gap.
23. The in-plane photonic device according to any one of the preceding items, wherein at least one or both the input and the output optical waveguides comprise lensing features, the lensing features being configured, such as coupled, for decreased reflection of the optical signal and/or increased transmission of the optical signal between the input and the output optical waveguides.

Configuration of the Ends

24. The in-plane photonic device according to any one of the preceding items, wherein the input optical waveguide comprises an input end and an input gap end and the output optical waveguide comprises an output gap end and an output end, wherein the input gap end interfaces the output gap end.
25. The in-plane photonic device according to item 24, wherein the input and the output gap ends are substantially planar.
26. The in-plane photonic device according to any one of items 24-25, wherein the input and the output gap ends are substantially parallel.
27. The in-plane photonic device according to any one of items 24-26, wherein the input and the output gap ends have substantially the same area.
28. The in-plane photonic device according to any one of items 24-27, wherein the input and the output gap ends have substantially the same shape.
29. The in-plane photonic device according to any one of items 24-28, wherein the input and the output gap ends are substantially rectangular.

30. The in-plane photonic device according to any one of items 24-29, wherein the input and the output gap ends each have an area between 1000 nm² and 100 µm².

Electrical Isolation Gap—Electrical Properties

31. The in-plane photonic device according to any one of the preceding items, configured such that the electrical resistance between the input and the output optical waveguide is at least 1 kΩ, such as at least 10 kΩ, such as at least 100 kΩ, such as at least 1 MΩ, such as at least 10 MΩ, such as at least 100 MΩ, such as at least 1 GΩ, such as at least 10 GΩ, such as at least 100 GΩ, such as at least 1 TΩ, such as at least 10 TΩ.

Wires

32. The in-plane photonic device according to any one of the preceding items, wherein the input and/or the output optical waveguide(s) comprise one or more wires.
33. The in-plane photonic device according to any one of the preceding items, wherein the input and/or the output optical waveguides are suspended slot waveguides.
34. The in-plane photonic device according to any one of the preceding items, wherein the wires form one or more connections between the waveguide(s) and one or more bulk materials in proximity of the waveguide(s).
35. The in-plane photonic device according to any one of the preceding items, wherein the wire(s) are configured such that they suspend the input and/or the output optical waveguides.
36. The in-plane photonic device according to any one of the preceding items, wherein the input and/or the output optical waveguide(s) comprise one or more wires, forming a connection between the waveguide(s) and one or more bulk materials in proximity of the waveguide(s).
37. The in-plane photonic device according to item 36, wherein the wire(s) are configured to provide mechanical stability to the optical waveguide(s), such as by forming a suspension system.
38. The in-plane photonic device according to any one of items 36-37, wherein the wire(s) are configured to provide an electrical connection between the waveguide(s) and the bulk material(s), such as by being provided in an electrically conductive material.
39. The in-plane photonic device according to any one of items 36-38, wherein the wire(s) together with the waveguide(s) are configured to provide an electrical connection between two or more bulk materials.
40. The in-plane photonic device according to any one of items 36-39, wherein the input optical waveguide forms an electrical connection between different bulk materials than the output optical waveguide.
41. The in-plane photonic device according to any one of items 36-40, wherein the electrical connection is substantially perpendicular to the direction of propagation of the optical signal.
42. The in-plane photonic device according to any one of items 36-41, wherein the one or more wires has a larger contacting region with the bulk material than with the input and/or output optical waveguide.
43. The in-plane photonic device according to any one of items 36-42, wherein at least a subset of the wires are provided in pairs, positioned on the same waveguide and contacting the bulk material on each side of said waveguide.
44. The in-plane photonic device according to item 36-43, wherein the pairs of wires, positioned on the same waveguide, are configured for providing an electrical connection, such as by being provided in an electrically conductive material, such as wherein the electrical connection(s) has lower electrical resistance than the electrical isolation gap, between the bulk material on each side of said waveguide.

Gap Angle

45. The in-plane photonic device according to any one of the preceding items, wherein the plane of the gap forms a gap angle to the direction of propagation of the optical signal.
46. The in-plane photonic device according to item 45, wherein the gap angle is approximately π/2 rad.
47. The in-plane photonic device according to any one of items 45-46, wherein the gap angle is between π/180 and π/2 rad.

Materials

48. The in-plane photonic device according to any one of the preceding items, wherein said device consists of or comprises a conductive material.
49. The in-plane photonic device according to any one of the preceding items, wherein said device consists of or comprises a material selected from the list including silicon, indium phosphide, gallium arsenide, silicon carbide, silicon nitride, aluminum gallium arsenide, silicon oxide, silicon oxynitride, gallium nitride or combinations thereof, such as mixes, alloys, or digital alloys, wherein the material further may be doped.
50. The in-plane photonic device according to any one of the preceding items, wherein the input and the output optical waveguides are provided on an insulator, such as wherein the insulator is selected from the list including air, vacuum, silicon dioxide, silicon oxides, alumina, titania, hafnia, polymers, ceramics.
51. The in-plane photonic device according to any one of the preceding items, wherein said device consists of or comprises a material with a refractive index between 1.1 and 4.0, such as between 1.5 and 4.0, such as between 2.5 and 4.0, such as between 3.25 and 3.75, such as between 3.4 and 3.6.

Manufacturing

52. The in-plane photonic device according to any one of the preceding items, wherein said device has been fabricated by micro- and nanolithography methods selected from the list including electron beam lithography, Ion-beam lithography, ion-beam milling, Laser-cutting, nano-imprint lithography, ultraviolet lithography, deep ultraviolet lithography, extreme ultraviolet lithography, proton-beam lithography, nanoscribe, X-ray lithography, (Talbot) interference lithography, magnetolithography, scanning probe lithography or neutral particle lithography, such as 3D printing.
53. The in-plane photonic device according to any one of the preceding items, wherein the configuration of said device has been designed by topology optimization.

The invention claimed is:

1. An in-plane photonic device for use in a photonic integrated circuit with in-plane crossings of electrical connections and photonic waveguides, comprising:
   at least one input optical waveguide; and
   at least one output optical waveguide;
   wherein the at least one input optical waveguide and the at least one output optical waveguides are positioned such that a gap between them separates the input and the output optical waveguide(s), and
   wherein at least one of the input optical waveguides and/or at least one of the output optical waveguides comprise at least one subwavelength lensing feature, such that the input and the output optical waveguides are configured for optical mode matching across the gap, such that an optical signal can be transmitted from the input optical waveguide to the output optical waveguide across the gap with a transmission of at least 90% and with a reflection of less than 10%, such that the in-plane photonic device forms an in-plane electro-photonic circuit crossing, wherein the at least one subwavelength lensing feature comprises a material with a different index of refraction than surrounding material of the corresponding waveguide, and/or the subwavelength lensing feature comprises forming at least a part of the input waveguide and/or the output waveguide by means of concave and/or convex structures.

2. The in-plane photonic device according to claim 1, wherein the gap is a subwavelength gap with a size of the gap of between $\lambda/200$ and $\lambda/5$, wherein $\lambda$ is the shortest wavelength of the optical signal.

3. The in-plane photonic device according to claim 1, wherein the size of the gap is less than 500 nm, or between 10 nm and 200 nm.

4. The in-plane photonic device according to claim 1, wherein the gap is an electrical isolation gap configured for electrically isolating the optical waveguides.

5. The in-plane photonic device claim 1, wherein the input and/or output optical waveguides comprise one or more wires configured to provide a connection to one or more bulk materials in proximity of said waveguide(s) wherein the wires are configured for forming an electrical connections between bulk materials on both sides of the waveguide(s), whereas the gap is an electrical isolation gap configured for electrically isolating the optical waveguides.

6. The in-plane photonic device according to claim 5, wherein the input and/or the output optical waveguides are suspended from the one or more bulk materials, by the one or more wires.

7. The in-plane photonic device according to claim 5, wherein the input optical waveguide forms an electrical connection between different bulk materials than the output optical waveguide.

8. The in-plane photonic device according to claim 1, wherein the gap is configured to prevent electrical conduction across the gap.

9. The in-plane photonic device according to claim 1, wherein the gap is configured to prevent thermal conduction across the gap.

10. The in-plane photonic device according to claim 1, wherein the gap is configured to prevent mechanical motion across the gap.

11. The in-plane photonic device according to claim 1, wherein the at least one subwavelength lensing feature is configured for lensing of the optical signal across the gap.

12. The in-plane photonic device according to claim 1, wherein said device is configured for lensing of an expanded or shrunken mode of the optical signal.

13. The in-plane photonic device according to claim 1, wherein each waveguide comprises a mode converter near the gap, or at the gap.

14. The in-plane photonic device according to claim 1, wherein one of the input and the output waveguides comprise a mode converter for expanding the optical mode, and the other comprise a mode converter for shrinking the optical mode of the optical signal.

15. The in-plane photonic device according to claim 14, wherein the input mode converter and the output mode converter comprise the lensing features.

16. The in-plane photonic device according to claim 1, wherein the input and the output optical waveguides are mirror symmetric with the plane of symmetry along the center of the gap and/or wherein the input optical waveguides are identical to the output optical waveguides, but rotated 180 degrees.

17. The in-plane photonic device according to claim 1, wherein the input and/or the output optical waveguides are slot waveguides.

18. The in-plane photonic device according to claim 1, wherein said device is configured for an optical signal with a wavelength in the range 1300 nm and 1700 nm.

19. A planar integrated circuit having in-plane crossings of electrical connections and photonic waveguides, the planar integrated circuit comprising one or more of the in-plane photonic devices according to claim 1.

20. The planar integrated circuit of claim 19, comprising at least one isolated part and wherein at least one of said in-plane photonic devices is configured for current supply and/or voltage control of said at least one isolated part.

\* \* \* \* \*